INVENTORS
FRANK G. HIGGASON JR.
ROBERT J. SEHNERT
HARRY E. RUECKEL

BY Anderson, Luedeka, Fitch, Even, & Tabin ATTORNEYS

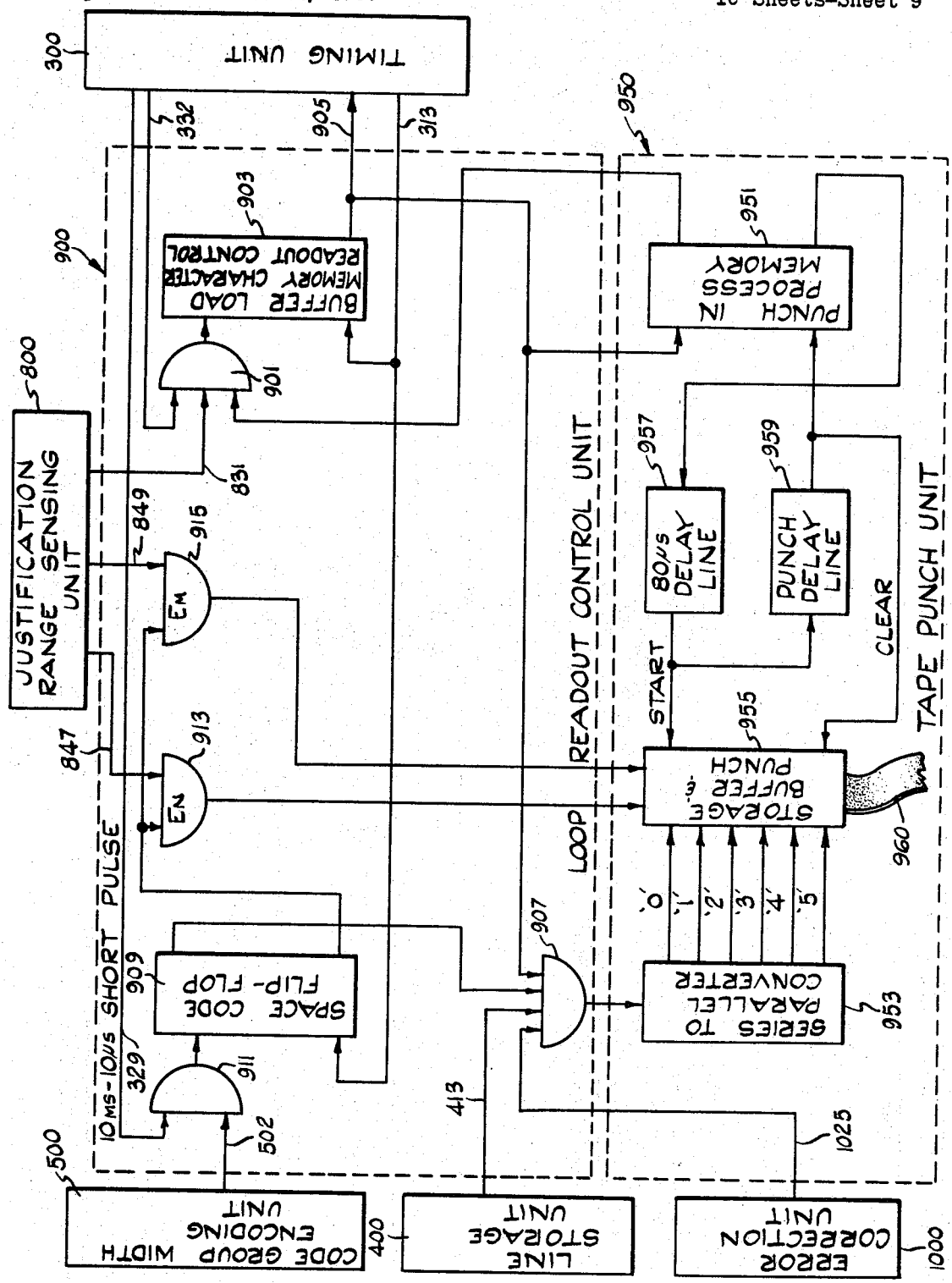

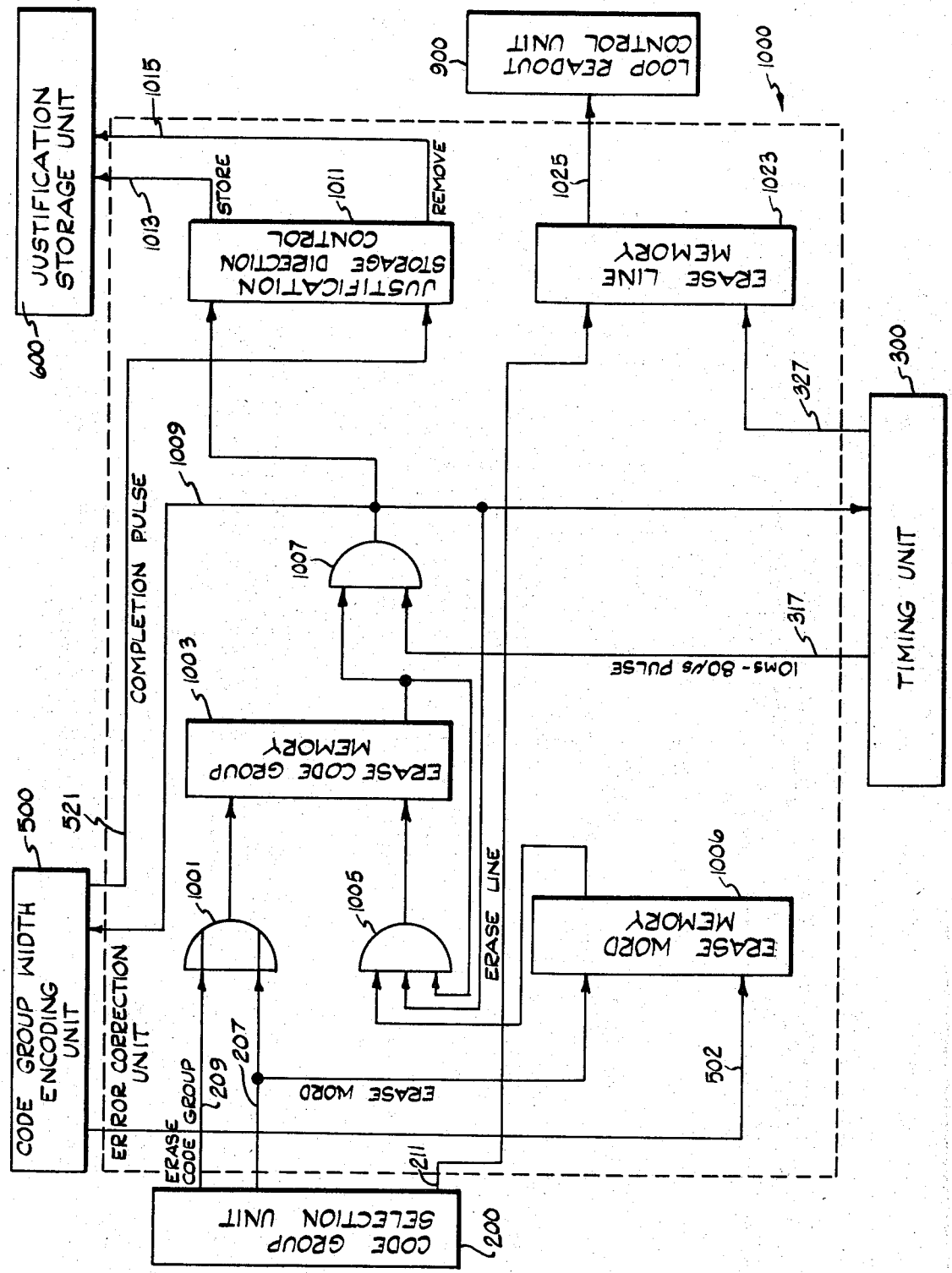

# United States Patent Office 3,530,976
Patented Sept. 29, 1970

3,530,976
TYPE JUSTIFICATION APPARATUS
Frank G. Higgason, Jr., Arlington Heights, Robert J. Sehnert, Palatine, and Harry E. Rueckel, Buffalo Grove, Ill., assignors to Ludlow Typograph Company, Chicago, Ill., a corporation of Delaware
Continuation of application Ser. No. 600,859, Dec. 12, 1966. This application July 11, 1969, Ser. No. 842,830
Int. Cl. B41b 9/06
U.S. Cl. 199—18      7 Claims

ABSTRACT OF THE DISCLOSURE

The apparatus is employed to produce justified coded information for the control of typesetting equipment in the composition of a justified line. The apparatus includes a code group selection unit wherein the particular character spaces and functional commands are selected manually by the operator in accordance with the particular textural material to be justified, the output of the code group selection unit being in the form of a binary code group. The code group is introduced into a closed delay loop under the control of an input timing means which is synchronized to indicate the position in the delay loop of the last code group to be entered. The closed delay loop includes a delay line having sufficient capacity to store code groups representing one line of type, the output of the delay line being coupled to the input of the delay line except when code groups are being fed to and from the delay loop. As each code group is introduced into the closed delay loop, it is sampled and the sampled information is introduced into a code grop width encoding unit, which provides a width signal representative of the width of the tye matrix represented by the code group being sampled. The width signals are introduced to a justification storage unit which provides a remainder signal repersenting the width of the line unoccupied by the matrices represented by the code groups stored in the closed delay loop. The sampled code groups representing space matrices are simultaneously fed into a space code group width encoding unit which provides a space signal related to the total of the sampled spaces. The space signal is compared with the remainder signal and when the information stored in the closed delay loop is within justification range, a signal is given to the operator. Upon command from the code group selection unit, the code groups stored within the closed delay loop are read out, with code groups representing fixed space bands being added to the minimum space bands as needed for justification, and the code groups pass into a tape punch unit wherein they are used in the punching of a paper tape. The apparatus also includes an error correction unit which permits the operator to correct errors in the code groups stored in the delay loop.

---

This application is a continuation of copending application Ser. No. 600,859 filed Dec. 12, 1966, now abandoned.

This invention generally relates to an apparatus for providing information which may be used for directing the composing of type so as to provide a justified line. A more particular object is to provide an apparatus for receiving unjustified material and for automatically processing same thereby providing output information which may be used to control the operation of type composing equipment so as to direct the arrangement of the type in justified form.

Textural material, which is to be printed, is usually provided in unjustified form and during composing is set with a matrix known as a minimum spaceband which is positioned between the characters which form the words of a line. The minimum spaceband provides the minimum in space between the words, but can be expanded during composing. The minimum spaceband is capable of widthwise expansion to a total width equivalent to a minimum space plus a Δ space. To make the minimum space between the words larger, an EN fixed space or an EM fixed space is added to the minimum spaceband. The line is said to be justified when the total width of the characters plus the accumulated spaces occupied by the minimum width of the minimum spacebands plus any fixed space bands used is less than the total preassigned line length and further when the width of the characters and fixed space bands, if any, plus the total maximum width of the minimum spacebands exceeds the predesignated line length. Thus, the selection of the minimum spaceband and fixed space combination selected for justification is determined by the number of characters upon the line and the line tightness desired.

In an effort to increase the speed and efficiency of the process of determining when a group of words is within justification range and the particular justification to be used, various automated systems have been devised. With such systems the operator is generally required to type the material by means of a kyeboard into the system. Thereafter, the system selects the appropriate minimum spaceband-fixed space combination, and provides output information for controlling a line casting or similar machine. With such systems the operator is usually required to wait until the apparatus has completely fed out the justification information before a subsequent line may be introduced into the system. Further, should an error occur during typing, the operator is frequently required to erase the entire line rather than correct the erroneous character or function. Each of the aforementioned procedures requires time which reduces the speed and efficiency of the system.

A main object of this invention is to provide a justification apparatus with increased operational speed and flexibility. A further object is to provide an apparatus wherein the incoming textual information may be introduced into the apparatus while a previously justified line is simultaneously being fed out. A still further object is to provide a justification apparatus which permits the improved editing of errors as they are recognized by the operator. Still another object is to provide an improved type justification apparatus which is generally convenient in operation and economical to manufacture.

Other objects and advantages of the present invention will become apparent through reference to the following description and accompanying drawing which shows an illustrative embodiment of this invention, in which:

FIG. 1 is a block diagram of the various units which comprise a preferred embodiment of the operational system of an apparatus in accordance with this invention. The following figures, with the exception of FIG. 7, relate to various units illustrated in FIG. 1 with respective component parts thereof designated by numerals having a hundreds level corresponding to the number of their respective figure.

FIG. 9 is a diagrammatic illustration of the loop readout control unit and the tape punch unit forming component parts of the apparatus illustrated in FIG. 1, and;

FIG. 10 is a component diagram of the error correction unit of FIG. 1.

GENERAL DESCRIPTION

Figure 1:
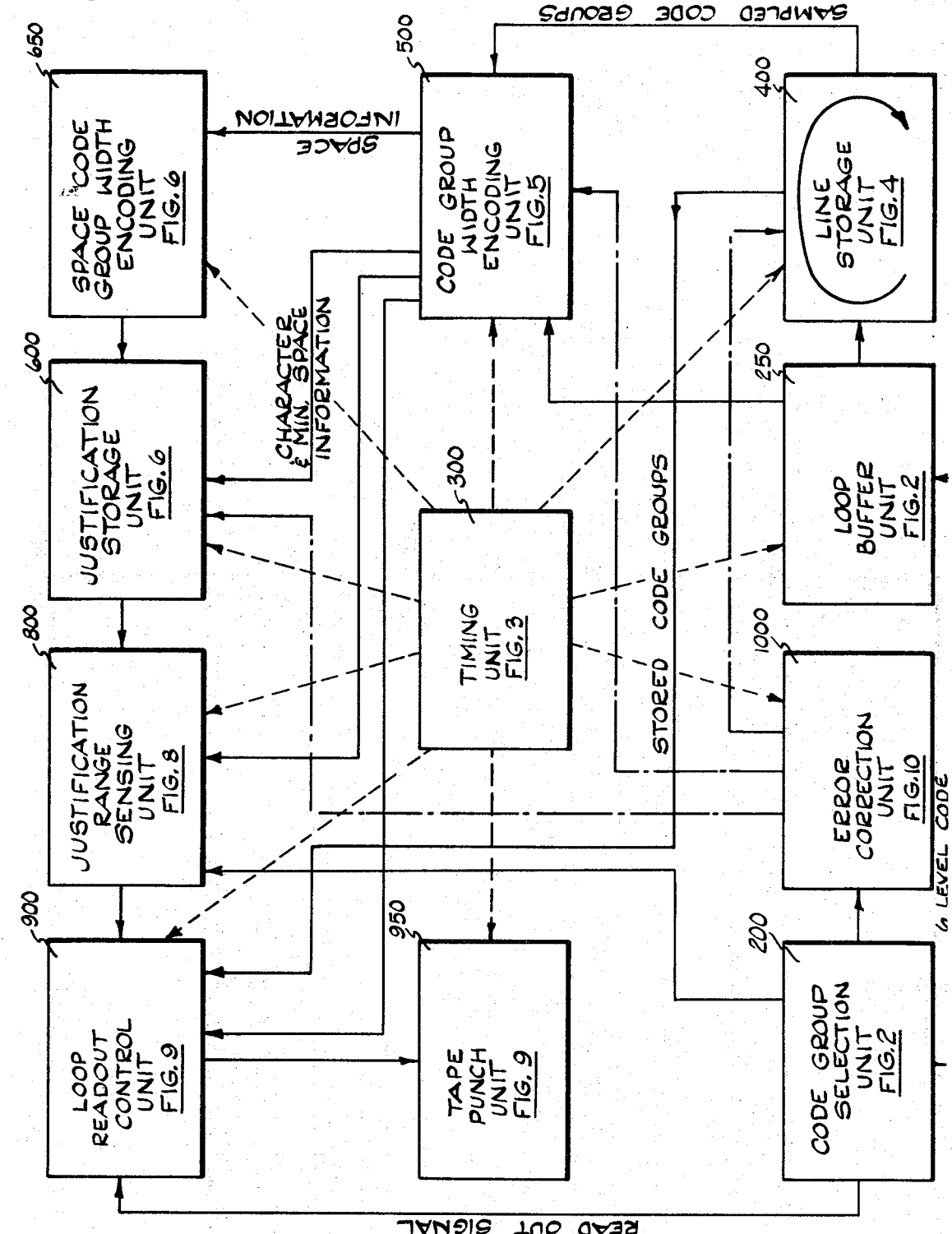

Referring to FIG. 1, the apparatus includes a code group selection unit 200 wherein the particular characters, spaces and functional commands are selected manually by the operator in accordance with the particular textual material to be justified. The output signal from the code group selection unit 200 is, in the illustrated embodiment, in the form of binary code having six informational levels. Before proceeding, it should be understood that the particular code used and timing sequences described hereinafter have been selected to facilitate description of the illustrated embodiment.

The code group selection unit 200 output is introduced into a loop buffer unit 250 which receives the six level code, at a relatively slow speed from the selection unit 200, stores each code group and feeds same at an increased speed determined by a timing unit 300 into a line storage unit 400. The storage unit 400 includes a storage means having the capability of storing a sufficient number of binary code groups so that at least one line of type may be stored therein.

As each code group is introduced into the line storage unit 400, it is sampled, and the sampled information is introduced into a code group width encoding unit 500. This unit 500 receives the various sampled character, space, and function codes, which in their type matrix form are of varying width and converts each of them into signals, the duration of which is representative of the width of the type matrix represented by the code being sampled. The width signals are introduced into a justification storage unit 600 which counts the signals corresponding to the various character widths together with minimum space widths and provides a count representing the width of the line unoccupied by the matrices represented by the stored code groups, i.e., the line remainder. The sampled code groups representing space matrices are simultaneously fed into a space code group width encoding unit 650. The output of the unit 650 is accumulated in the space section of the justification storage unit 600. The accumulated space information is compared with the line remainder and when the line is within justification range, such condition is sensed by a justification range sensing unit 800.

When the information upon the loop 402 is within justification range, a signal is given to the operator. Upon command from the code group selection unit 200, which command may be in the form of a space bar, carriage return or designated key, the code groups stored within the line storage unit 400 are read out by a loop readout control unit 900. The code groups pass from unit 900 into a tape punch unit 950 wherein they are used to control the punching of a paper tape 960 or processing of other media used for control of a type-setting or photocomposing machine. The apparatus also includes an error correction unit 1000 which permits the operator to correct errors as they are recognized.

SELECTION AND LOOP BUFFER UNITS

Figure 2:
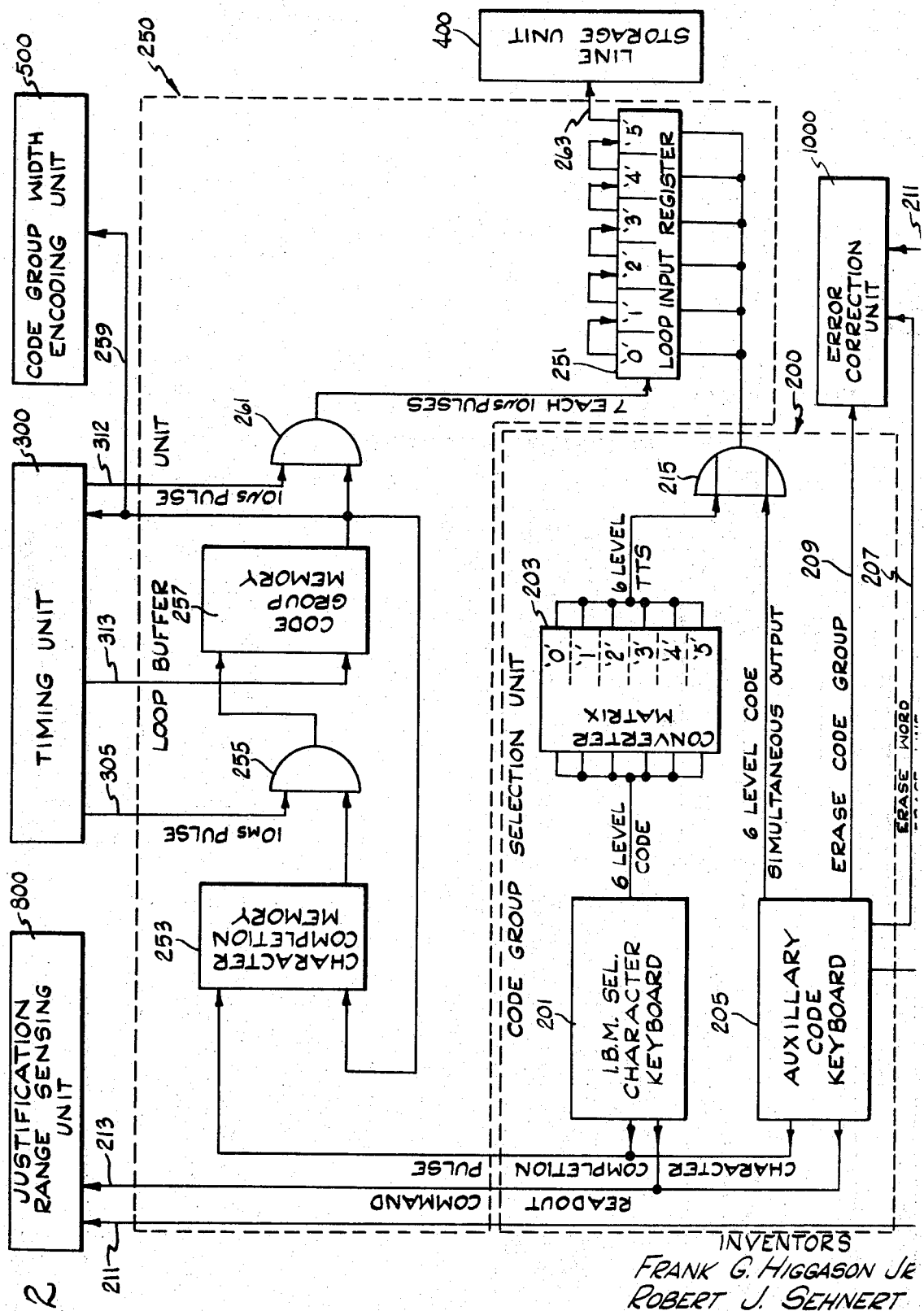
FIG. 2 is a diagrammatic illustration of the code group selection unit and the loop buffer unit shown in FIG. 1.

As previously mentioned, the code group selection unit 200 includes means by which the operator manually selects the characters, spaces, and functions desired. More specifically, as shown in FIG. 2, the code group selection unit 200 includes a typewriter 201 such as an "IBM Selectric" having a conventional character keyboard. The output of the typewriter 201 is in the form of a six-level binary code. Since the code provided by the typewriter 201 is not suitable for typesetting, the output thereof is fed into a converter matrix 203 of construction well known in the art. The converter matrix 203 converts the six-level code from the typewriter 201 into six-level Tele Type Setters (TTS) binary code. Each code group passing from the typewriter 201 and through the converter matrix 203 is 60 milliseconds in duration.

Since the typewriter 201 illustrated is a commercially available model, certain other functions, such as quadleft, quad-right, stop code and kill line are provided by means of an auxiliary code keyboard 205, the output of which is preferably in the form of six-level (TTS) binary code groups. Erase command signals are fed by means of conductors 207, 209 and 211 to the error correction unit 1000 for processing in a manner to be hereinafter described. The readout signal is fed to the justification range sensing unit 800 via conductor 213. The output of the auxilary keyboard 205 and the converter matrix 203 are fed into a selection unit "or" gate 215, the output of which is connected to a loop input register 251 which is a component of the loop buffer unit 250. The input register 251 is a conventional shift register having six positions corresponding to the six code levels. Each level is capable of storing one bit of information. The information is fed from the register 251 to the storage unit 400 at a rate which will be hereinafter described.

Upon completion of each character or space, or upon completion of each auxiliary code, a character completion pulse is provided by either the typewriter 201 or auxiliary keyboard 205. The completion pulse is fed into the set input of a character completion memory 253, which is a conventional bistable flip-flop circuit. The completion pulse produces an output pulse at the set output which is introduced into one input of a code group memory "and" gate 255, the other input of which receives a signal from a timing unit 300.

Figure 3:
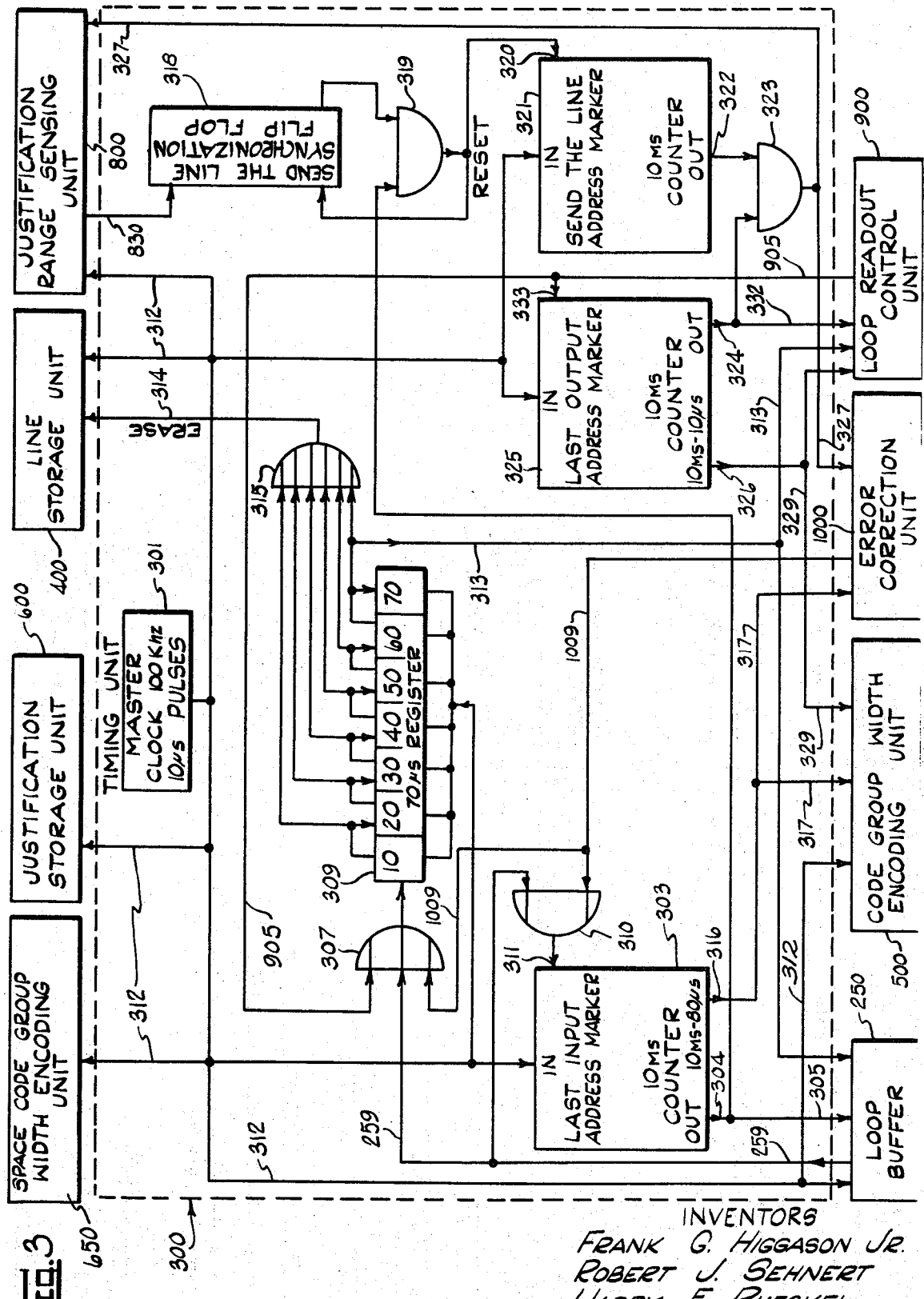
FIG. 3 is a diagram of the timing unit shown in FIG. 1 which provides timed signals for controlling the operation of the justification apparatus.

Referring to FIG. 3, the timing unit 300 includes a master clock 301 which has, in the illustrated embodiment, a frequency of 100 kHz. thereby providing 10 microsecond pulses which are fed into the input of a last input address marker 303. The last input address marker 303 is a counter of conventional construction having an automatic reset feature. For each 1,000 pulses from the master clock 301 the last input address marker 303 provides a single pulse at its output terminal 304 which is connected to the loop buffer 250 by a conductor 305. The pulses are thus spaced 10 milliseconds apart. The conductor 305 is connected to one input of the code group memory "and" gate 255. Upon the occurrence of the next 10 millisecond pulse after the character completion memory 253 has been set by a character completion pulse, a pulse is provided from the output of the "and" 255 into the set input of a code group memory 257, which may be a conventional bistable flip-flop causing it to set. The reset output of the memory 257 is connected to the reset terminal of the character completion memory 253 serving to reset the completion memory 253 in preparation for the processing of a subsequent completion character pulse.

The set output of the code group memory 257 is connected by a conductor 259 to the input of a 60 microsecond register input "or" gate 307 forming a component of the timing unit 300 and it is also connected to the code group width encoding unit 500 for purposes to be hereinafter more clearly described. The pulse passes through the "or" gate 307 into a 70 microsecond shift register 309. The register 309 is of conventional construction and has each of the units thereof connected to the output of the master clock 301 so that the input pulse from the gate 307 completes one shift within the register 309 each 10 microseconds. The set signal from the memory 257 is applied through a reset "or" gate 310 to a reset hold terminal 311 of the address marker 303 temporarily inhibiting reset thereof.

The set output of the code group memory 257 is connected to one input of a code group memory output "and" gate 261, the alternate input of which receives 10-microsecond pulses from the clock 301 along a conductor 312. So long as the start pulse, which is applied to the input of the 70 microsecond shift register input "or" gate 307, is passing through the shift register 309, seven 10-microsecond signals will pass through the code group memory output "and" gate 261 and into the input register 251 thereby causing the six-level code group stored therein to be fed out at a rate of 10 microseconds per bit or 60 microseconds per code group. The seventh pulse provides a 10-microsecond space interval after send out of the code group, as will subsequently be more clearly described. After completion of the 70-microsecond period, the pulse passes from the register 309 and along a conductor 313 to the reset terminal of the code group memory 257 thereby resetting the memory 257 in preparation for a subsequent character code. Reset of this memory 257 removes the signal to the code memory output "and" gate 261 thereby interrupting the flow of 10-microsecond pulses to the input register 251. Simultaneously therewith, the reset hold signal is removed from the reset terminal 311 of the last input address marker 303 allowing it to resume normal operation.

Briefly, the operator selects the particular character, space or function desired by depression of an appropriate key. The code group selected is fed in the form of a six-level binary TTS code to the input register 251 wherein it is stored. Upon the arrival of the character completion pulse to the loop buffer unit 250 seven 10 microsecond timing pulses are fed into the input register 251 causing the code group stored therein plus one space interval to be fed into the line storage unit 400 by way of a conductor 263.

LINE STORAGE UNIT

Figure 4:
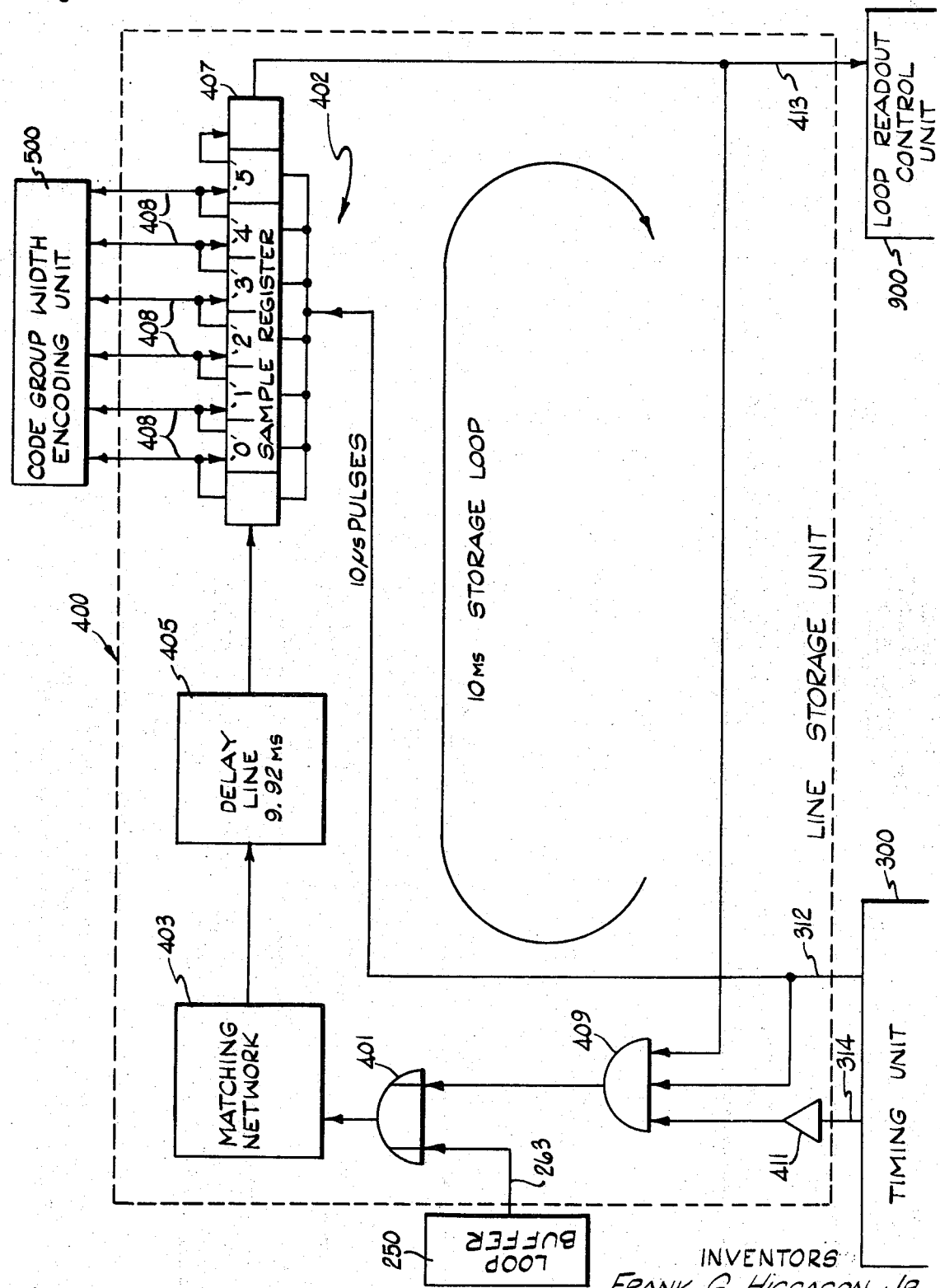
FIG. 4 is a block diagram of the line storage unit forming a component of the apparatus of FIG. 1.

Code groups at a speed of 60 microseconds per group are fed by the conductor 263 into one input of a loop storage input "or" gate 401 forming a component of a closed delay or storage loop 402 illustrated in FIG. 4. The output of the "or" gate 401 is connected to an impedance matching network 403 which matches the output impedance of the "or" gate 401 to a delay line 405. The delay line 405 may be of conventional construction such as a magnetostrictive line, and is adjustable to a value of approximately 9.92 milliseconds. The delay line 405 serves as a stoage means for the code groups introduced into the storage loop 402. In this connection, the delay line 405 permits subsequent code groups to be introduced into its input while prior code groups are passing through the delay line 405. As the various code groups circulate about the storage loop 402, they pass through a sample register 407 the input of which is connected to the output of the delay line 405. The register 407 is provided with eight positions and is of conventional construction. The register 407 is actuated by means of 10 microseconds pulses supplied by the timing unit 300 via conductor 312. Thus, 80 microseconds are required for a bit to pass through the register 407. The 80-microsecond time lag together with the 9.92 millisecond time delay provided by the delay line 405 provides a total of 10-millisecond stoage loop delay. It should be noted that this storage loop delay is equivalent to the time between output pulses from the last input address marker 303, i.e., 10 milliseconds. The second through seventh register positions are connected to the code group width encoding unit 500 by conductors 408.

At that instant when the last six-level code fed into the storage unit 400 is situated in the second through seventh positions of the sample register 407, the code group is sampled by the code group width encoding unit 500 as will hereinafter be described. The information entering the input "or" gate 401 passes through the delay line 405 and through the register 407 to an erase "and" gate 409 and to the recirculation input of the input "or" gate 401. The erase "and" gate 409 is provided with three inputs, the first of which receives information from the register 407 and the second of which receives 10-microsecond clock pulses from the master clock 301, for the purpose of maintaining the proper timing sequence between the bits circulating about the loop 402.

The third input of the "and" gate 409 is connected to the output of the 70-microsecond shift register 309 through a conductor 314, an inverter 411 and a shift register output "or" gate 315. During shifting of the register 309, the "and" gate 409 is gated off whereby erasing some of the information flowing about the loop 402. This erase feature prevents information from passing through the recirculation input of the "or" gate 401 during that portion of the operational cycle when information is being fed into the storage loop 402. While normally such an overlapping condition does not exist, this erase feature provides a second measure of safety. Further, this erase feature is used to erase the loop 402 as information is being read out along a conductor 413 in response to a command from the loop readout control unit 900 as will hereinafter be described.

In operation, information is fed from the loop buffer 250 into the input "or" gate 401 passing the code groups into the storage loop 402. Due to the reset hold signal applied by the code group memory 257 to the reset terminal 311 of the last input address marker 303 during operation of the 70-microsecond register 309, the last input address marker 303 starts counting 10 microseconds after the last bit of the code group enters the storage loop 402.

Since the storage loop 402 provides a 10 millisecond time delay and since the last input address marker 303 has a 10-millisecond repetition rate, the pulses therefrom will always occur 10 microseconds after the last bit of information in the last code group placed upon the loop 402 has passed through the input "or" gate 401 of the line storage unit 400. The 10-microsecond additional delay comprises the space interval between code groups as previously mentioned. This particular timing of the last input address pulse facilitates its use as a control signal for controlling the operation of the code group memory 257 and, correspondingly, the relative placement of the various code groups upon the storage loop 402. The introduction of subsequent code groups upon the storage loop 402 is accomplished in a manner similar to that previously described.

CODE GROUP WIDTH ENCODING UNIT

As previously mentioned, the last code group introduced into the storage loop 402 is sampled once by the code group width encoding unit 500. When the six bits of the last code group introduced into the loop 402 are located in register positions two through seven of the sample register 407, the code group width encoding unit 500 will sample the group. It should be noted that the time constants of the illustrated storage loop 402 are such that the time required for the last bit of the last introduced code group to pass from the input 'or" gate 401 to the second position of the sample register 407 is approximately 9.93 milliseconds (9.92-millisecond delay line plus a 10-microsecond register position).

Figure 5:
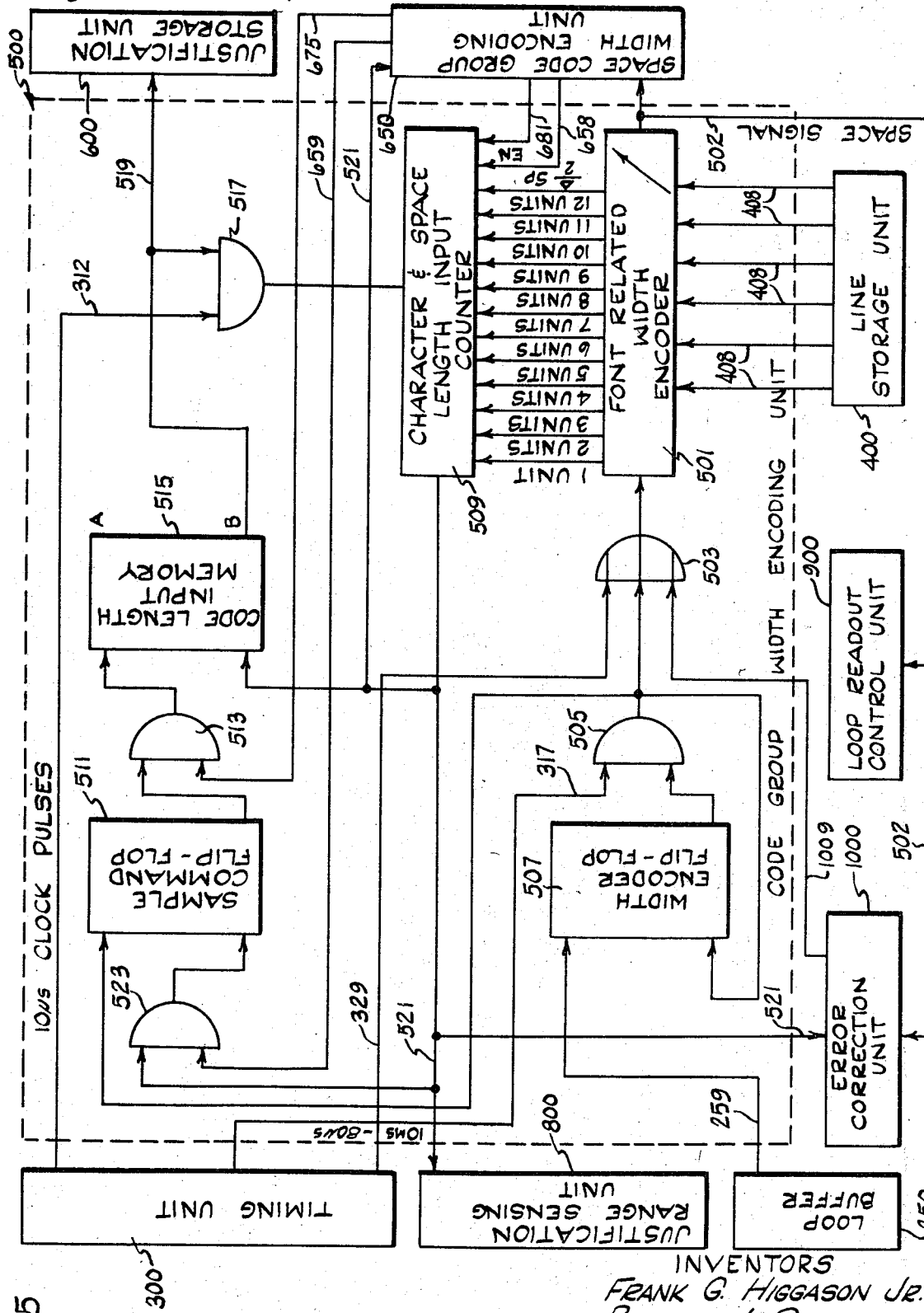
FIG. 5 is a block diagram of the code group width encoding unit shown in FIG. 1.

Referring to FIG. 5, the code group width encoding unit 500 includes a font related width encoder 501 which is connected by conductors 408 to the line storage unit 400. This encoder 501 is of construction well known to those skilled in the art and generally includes a matrix which receives the six code levels from the sample register 407 and encodes the same so as to supply a signal which corresponds to the width of the character or space read from the sample register 407. The matrix width of each character and space may be represented by an arbitrary unit palfe such as 1, 2, 3, 4 and 5 etc. For purposes of illustration, an EM space is assigned the arbitrary value 18, an EN space the value 9, and a "thin" or minimum space the value 6. Type widths generally vary depending upon the font used and the font related width encoder 501 includes suitable adjustment means which permit the operator to accommodate the particular font being used. In the event the code group within the sample register 407 is a space, the font related width encoder 501 not only provides a width related signal, but also provides a space signal to the space code group width encoding unit 650, the loop readout unit 900 and the error correction unit 1000 along a conductor 502 for processing in a manner to be hereinafter more clearly described.

The control signal to the font related width encoder 501 is obtained by means of an input "or" gate 503, one input of which is connected to the output of an encoder "and" gate 505. One input of the "and" gate 505 is connected to the set output of a width encoder flip-flop 507. Referring to FIG. 2, upon the commencement of the readout from the input register 251, a start pulse is fed along conductor 259 to the set input of the width encoder flip-flop 507 causing it to set thereby providing a signal to one of the inputs of the encoder "and" gate 505.

As previously mentioned, the reset of the last input address marker 303 of the timing unit 300 is held during the shifting of the 70-microsecond register 309. The hold signal is released 10 microseconds after the introduction of the last bit of the code group into the loop 402 and the last input address marker 303 starts counting. The last input address marker 303 also includes an output terminal 316 which provides an early pulse or as herein termed a "short pulse" which arrives 80 microseconds before the 10 milliseconds normal output pulse and is fed to the remaining input of the "and" gate 505 by means of a conductor 317. In reference to time sequencing, this short pulse occurs at exactly that instant when the bits of the last introduced code group in the storage loop 402 are in positions two through seven of the sample register 407. As previously mentioned, this short pulse is introduced into the alternate input of the width encoder "and" gate 505 and upon occurrence produces a signal which passes through the input "or" gate 503 into the font related with encoder 501 causing it to read the code group within the sample register 407 and thereby providing a width signal to the character and spaced length input counter 509. The signal introduced into the counter 509 corresponds to the width of the type matrix represented by the code group sampled and sets the counter 509 to a predesignated related value.

The alternate inputs of the "or" gate 503 are provided by the timing unit 300 and the error correction unit 1000 for purposes which will hereinafter be considered. The output of the width encoder "and" gate 505 is also connected to the reset input terminal of the width encoder flip-flop 507 for resetting thereof.

By cooperative operation of the width encoder flip-flop 507 and the "and" gate 505 only the last input address marker 303 short pulse which occurs immediately after the introduction of a code group into the storage loop 402 will be allowed to trigger the font related width encoder 501 and will occur at precisely that moment when the particular code group is within the designated sample register 407 readout positions. Thereafter the width encoder flip-flop 507 is reset.

As mentioned, the signal from the width encoder 501 to the character and space length input counter 509 sets the counter 509 to a value corresponding to the width of the type matrix represented by the last code group introduced into the storage loop 402. The short pulse signal from the output of the encoder "and" gate 505 is coupled to the set input of a sample command flip-flop 511 causing it to set thereby providing a signal to one of the inputs of a character length input "and" gate 513. The remaining input of the "and" gate 513 is provided by a normally present signal from the space code group width encoding unit 650. The output of the "and" gate 513 is coupled to the set input of a code length input memory 515, which may be a conventional bistable flip-flop, causing the same to set thereby providing a signal to the justification storage unit 600 via conductor 519 and to a character length input "and" gate 517. The remaining input terminal of the character length input "and" gate 517 is connected to the timing unit 300 by the conductor 312 for the receipt of 10 microsecond clock pulses therefrom.

The 10-microsecond clock pulses flow through the "and" gate 517 and into the character and space length input counter 509. These clock pulses cause the character and space length input counter 509 to count down. Upon completion of the countdown a completion pulse is produced which resets the code length input memory 515 and which is applied to the space code group width encoding unit 650 and to the justification range sensing unit 800 by way of a conductor 521. This reset pulse is also applied to one terminal of a sample command input "and" gate 523; the remaining terminal of which is connected to a normally present signal from the space code group width encoding unit 650. The output signal from the "and" gate 523 is connected to the reset terminal of the sample command flip-flop 511 setting it in preparation for a subsequent character.

Briefly, upon the introduction of a code group into the storage loop 402, the width encoder flip-flop 507 is set and 9.92 milliseconds thereafter a short pulse passes through the encoder input "and" gate 505 and the "or" gate 503 to the font related width encoder 501 causing the latter to read the code group within positions two through seven of the sample register 407 correspondingly setting the character and space length input counter 509 to a value related to the width of the type matrix represented by the sampled code group. As previously described, the character and space length input counter 509 is set and simultaneously therewith, the sample command flip-flop 511 is set as is the code length input memory 515, thereby opening "and" gate 517 permitting the 10-microsecond clock pulses to pass therethrough for countdown of the character and space length input counter 509. After countdown, a completion pulse is provided which resets both the sample command flip-flop 511 and the character length input memory 515. It should be noted that the number of clock pulses which pass into the character and space length input counter 509 for countdown thereof, determined by the setting of the counter 509, corresponding in number to the relative width of the type matrix represented by the code group sampled by the font related width encoder 501 from the sample register 407. Further, the relative lapse between the pulse which actuates the font related width encoder 501 which in turn sets the character and space length input counter 509 and the completion pulse from the character and space length input counter 509 is also related in length to the width of the type matrix represented by the code group.

JUSTIFICATION STORAGE AND SPACE CODE WIDTH ENCODING UNITS

Figure 6:
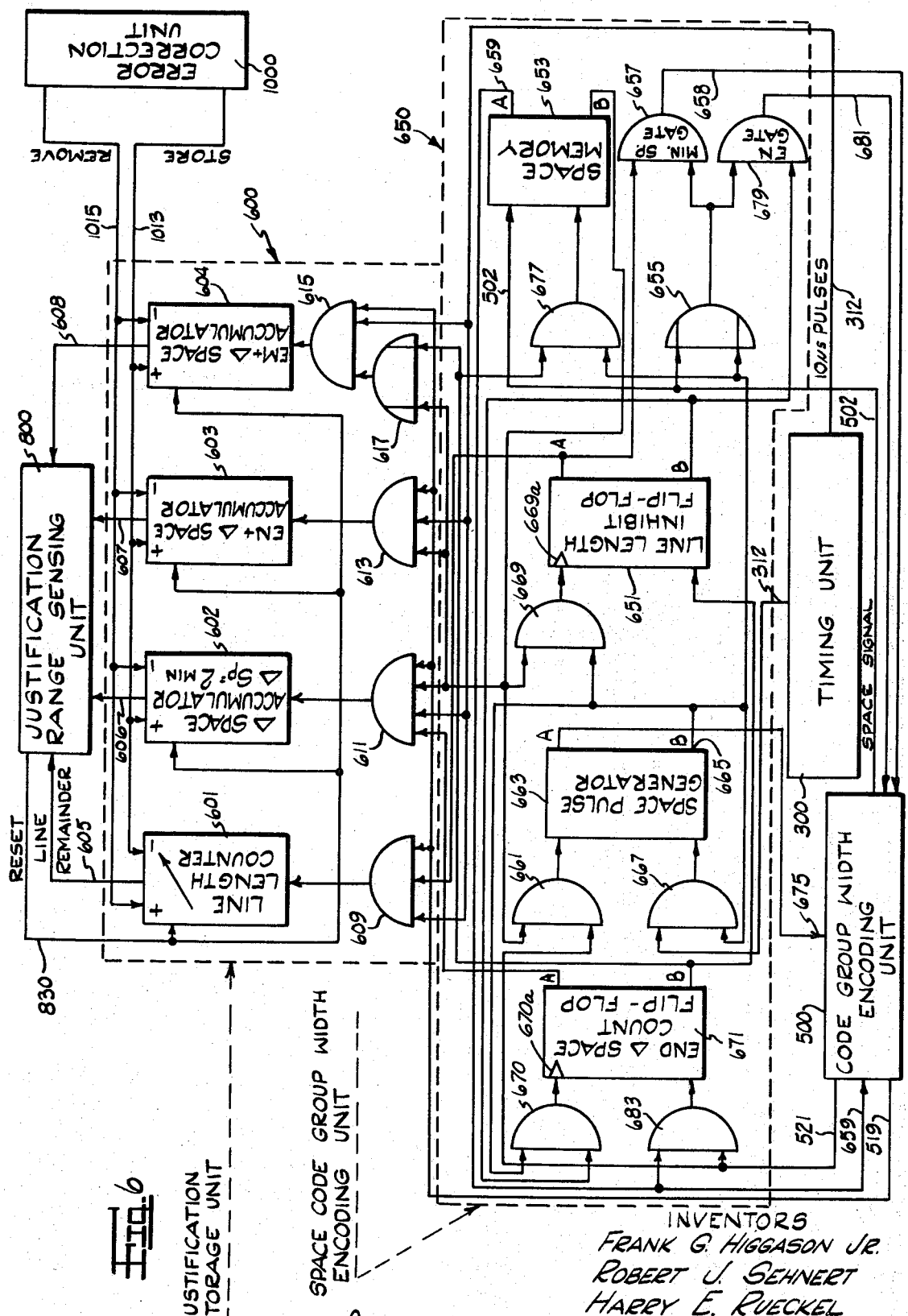
FIG. 6 is a component diagram of the space code group width encoding unit and the justification storage unit shown in FIG. 1.

The justification storage unit 600 illustrated in FIG. 6 includes a line length counter 601, a Δ space accumulator 602, an EN+Δ space accumulator 603, and an EM+Δ space accumulator 604. Each of the components 601, 602, 603 and 604 is in the form of a counter of conventional construction, which is controlled by clock pulses in a manner to be described. The output of each of the components 601, 602, 603 and 604 is respectively connected by conductors 605, 606, 607 and 608 to the justification range sensing unit 800. The line length counter 601 input is connected to the output of a line length counter input "and" gate 609; the Δ space accumulator 602 input is connected to the output of a Δ space accumulator input "and" gate 611; the EN+Δ space accumulator 603 input is connected to the output of an EN+Δ space accumulator input "and" gate 613; and the input to the EM+Δ space accumulator 604 input is connected to the output of an EM+Δ space accumulator input "and" gate 615. One input of the "and" gate 615 is connected to the output of an EM+Δ space accumulator "or" gate 617.

Serving to provide a common control signal to all of the input "and" gates 609, 611, 613, and 615 is the set output signal from the code length input memory 515 located in the code group 500 which is connected to the "and" gates 609, 611, 613, and 615 by the conductor 519. Further, a second input of each of the "and" gates 609, 611, 613, and 615 is commonly connected to timing unit 300 for receiving 10-microsecond clock pulses along conductor 312. The line length counter input "and" gate 609 is provided with a third normally present input signal which is supplied from the normal output of a line length inhibit flip-flop 651.

Briefly, simultaneously with the sampling of a code group by the font related width encoder 501, a signal is fed into the input of the code length input memory 515 which provides a signal via the conductor 519 to one input of the line length counter "and" gate 609 permitting clock pulses from the timing unit 300 to flow to the line length accumulator 601. Upon completion of the character and space length input counter 509 countdown, the code length input memory 515 is reset thereby interrupting the flow of clock signals to the line length counter 601. It should be noted that the line length counter 601 has received a quantity of clock pulses equal in number to the pulses which "ran-down" the character and space length input counter 509. Accordingly, since the line length counter 601 receives a quantity of pulses corresponding to the width of the type matrix represented by each of the code groups as they are fed into the storage loop 402, the total number of clock pulses received by the counter 601 is equal to the total length of line occupied by the type matrices of the code group upon the storage loop 402. The line length counter 601 is provided with a manual setting which is adjusted to a value equal to the total line length available. Upon the commencement of a new line into the storage loop 402 the counter 601 is automatically set, as will hereinafter be described, to this predetermined value and as each of the code groups pass into the storage loop 402, the corresponding clock pulses cause the counter 601 to countdown from this predetermined value. It should be noted that the output signal from the line length counter 601 corresponds to the amount of line unoccupied which will hereinafter be referred to as the line remainder.

Figure 7:
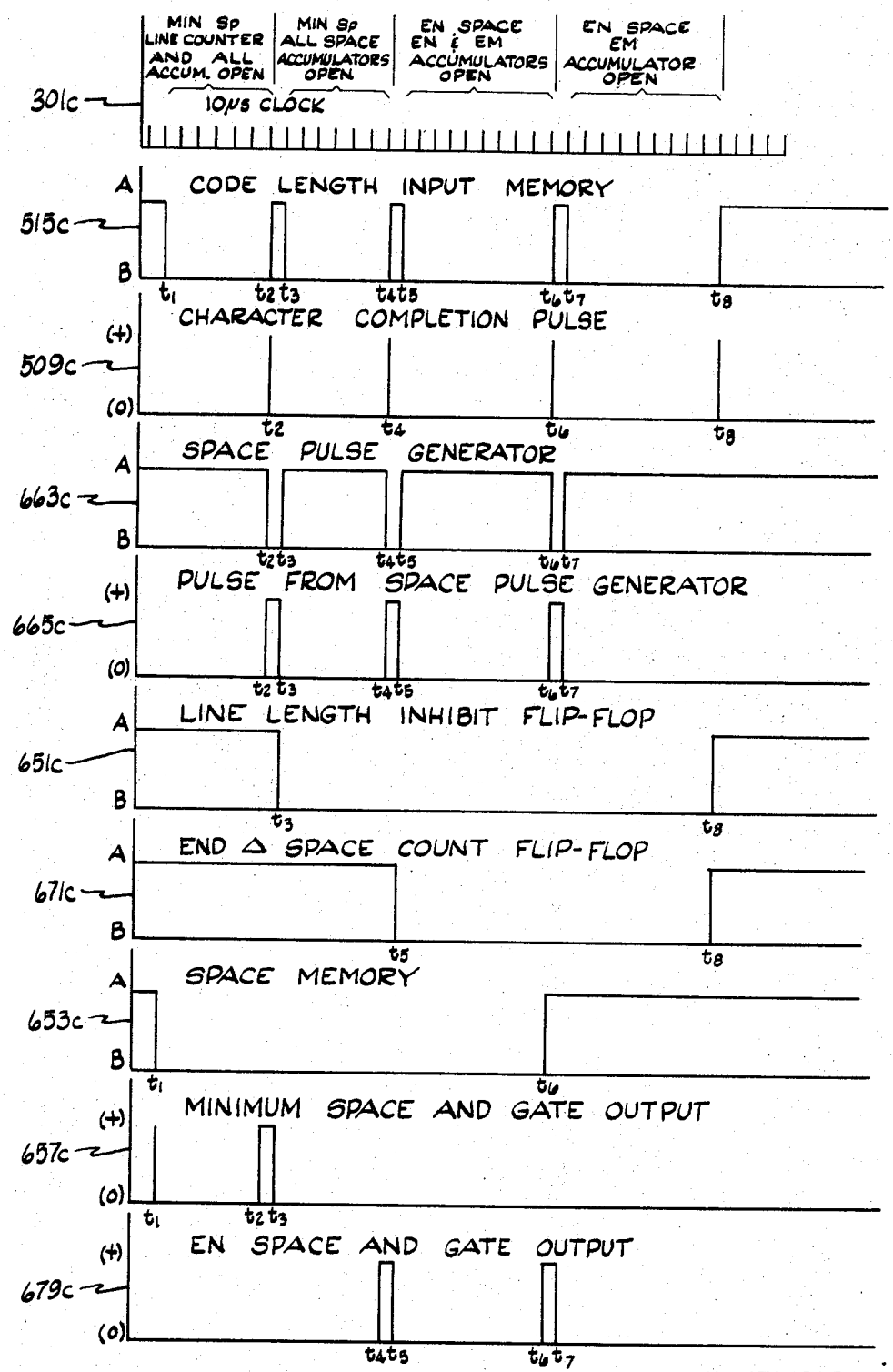
FIG. 7 is a timing diagram of the operational sequence of the various components which comprise the space code group width encoding unit of FIG. 6.

FIG. 7 includes several timing diagrams. Each diagram is numbered with a numeral corresponding to its respective component and with the subscript $c$. For example, the timing diagram of line length inhibit flip-flop 651 is numbered 651$c$ and the output terminals thereof designated A and B. For purposes of subsequent discussion, it is assumed that a code group representing a space matrix has been introduced into the storage loop 402 and sampled by the font related width encoder 501. The space signal at time $t_1$ is fed by way of conductor 502 to a space "or" gate 655, the output of which is connected to the input of a minimum space "and" gate 657 (657$c$) and fed from the output thereof to the character and space length input counter 509 by way of a conductor 658. Simultaneously, the font related width encoder 501 supplies the space signal along conductor 502 to the normal input of a space memory 653 (653$c$), which may be a conventional bistable flip-flop, causing it to set. The signal from the set output of the space memory 653 is applied to the Δ space accumulator "and" gate 611, the EN+Δ space input "and" gate 613 and to the EM+Δ space input "and" gate 615 through the EM+Δ space input "or" gate 617. The signal from the character space memory 653 is thus coupled to all of the accumulator input "and" gates 611, 613 and 615 gating them on so as to allow the 10-microsecond clock pulses to pass to the respective space accumulators 602, 603, and 604 for a period of time corresponding to the countdown of the character and space length input counter 509. Initially, the operation of the justification storage unit 600, during the processing of a space code, differs from the processing of a character code in that three space accumulators 602, 603 and 604 receive clock pulses together with the line length counter 601.

Upon completion of the countdown of the character and space length input counter 509 (509$c$) corresponding to time $t_2$ of FIG. 7, a completion pulse is coupled via the conductor 521 to the sample command input "and" gate 523. Due to the set condition of the space memory 653 (see 653$c$), which is connected to an input of the "and" gate 523 via a conductor 659, the "and" gate 523 is gated off thereby preventing resetting of the sample command flip-flop 511. The completion pulse of the character and space length input counter 509 is also fed to one input of a space pulse generator input "and" gate 661. The remaining input of the "and" gate 661 is connected to the set output B of the space memory 653 which receives a signal therefrom.

The character completion pulse passes through the "and" gate 661 and into the set input terminal of a space pulse generator 663 (663$c$) which is in the form of a conventional flip-flop circuit. Thereupon, the space pulse generator 663 sets and a set output terminal 665 (665$c$) supplies a signal to one input terminal of a space pulse generator reset "and" gate 667. The remaining terminal of the "and" gate 667 is connected to conductor 312 and supplied with 10 microsecond pulses by the clock 301. The first clock pulse arriving at the "and" gate 667 after the generator 663 has been set automatically resets the generator 663 at time $t_3$ (see diagram 663$c$). The resetting of the generator 663 produces a 10-microsecond pulse at terminal 665 which is diagrammatically illustrated in 665$c$. This pulse is coupled to the input of a line length inhibit input "and" gate 669, the alternate input of which is coupled to the set output of the space memory 653. The output of the "and" gate 669 is connected to the set input of the line length inhibit flip-flop 651 (651$c$). The input of this flip-flop 651 is provided with an inverter 669$a$ so that it will be set on the lagging edge of the pulse, in other words, at time $t_3$.

The generator 663 pulse is also coupled to one input of an end Δ space count input "and" gate 670, the output of which is connected to the set input of an end Δ space flip-flop 671 (671$c$). The space pulse does not pass through the "and" gate 670 since the alternate input thereof, which is connected to the set output B of the line length inhibit flip-flop 651, does not provide a signal until after the occurrence of the lagging edge of the space generator 663 pulse. Upon setting of the line length inhibit flip-flop 651, the signal which is normally provided to one of the inputs of the line length counter "and" gate 609 is removed, thus gating off the line length counter 601 during the subsequent processing of the space code.

The pulse from the terminal 665 of the space pulse generator 663 is connected to the alternate input of the "or" gate 655 and therethrough to one input of the minimum space "and" gate 657. The alternate input of the minimum space "and" gate 657 is connected to the reset output of the line length inhibit flip-flop 651. Upon arrival (time $t_2$) of the leading edge of the generator 663 output pulse at the input of the minimum space "and" gate 657, a signal is present at the "and" gate's 657 alternate input since the line length inhibit flip-flop 651 is set by the lagging edge (time $t_3$) of the space pulse (see diagrams 651$c$ and 657$c$). The output of the "and" gate 657 which is connected to the character and space length input counter 509 sets it to a value corresponding to the width of a minimum space which as previously mentioned is equivalent to one-half of a Δ space.

As previously mentioned, the space pulse generator 663 sets and resets in approximately 10 microseconds. Upon reset, the reset output of the generator 663 is coupled by means of a conductor 675 to the character length input "and" gate 513. Since reset of the sample command flip-flop 511 is prevented by removal of the space memory 653 reset output signal, the reset output signal from the generator 663 passes through the "and" gate 513 to the set input of the code length input memory 515 causing it to set and thereby gate the "and" gate 517 on, allowing 10-microsecond clock pulses to pass therethrough to the character and space length input counter 509 for countdown thereof. In a manner similar to that previously described, each of the three space accumulators 602, 603 and 604 receives clock pulses equal in number to those received by the character and space length input counter 509. It should be noted that the line length counter 601 is turned off by the removal of the signal from one of the inputs of the input "and" gate 609. The setting of the line length inhibit flip-flop 651 gates the "and" gate 609 off. Clock pulses continue to pass into the three space accumulators 602, 603, and 604 until completion of the countdown of the character and space length input counter 509. Upon completion thereof which corresponds to time $t_4$ of FIG. 7, a character completion pulse is created which is fed to the code length input memory 515 for reset thereof. Reset of the code length memory 515 gates off each of the accumulator's input "and" gates 611, 613, and 615. Thus, at time $t_4$, each of the space accumulators 602, 603 and 604 have received clock pulses which are related in quantity to the type matrix width of two minimum spacebands or one Δ spaceband.

The character completion pulse from the character and space length input counter 509 also passes to the space pulse generator input "and" gate 661 causing the space pulse generator 663 to set and reset as previously described, thereby providing a single 10-microsecond pulse at terminal 665 (665c). This space pulse is coupled to one input of the end Δ space count flip-flop input "and" gate 670, the alternate input of which is connected to the set output of the line length inhibit flip-flop 651 which as illustrated in 651c, provides a signal at terminal B. The end Δ space count flip-flop 671 includes an inverter input 670a so that it sets on the lagging edge of the pulse which corresponds to time $t_5$ in diagram 671c of FIG. 7. The pulse is also coupled to one input of a space memory reset "and" gate 677. However, since the alternate input terminal of the "and" gate 677 is coupled to the set output of the end Δ space count flip-flop 671 which, due to its inverter 670a, flips on the lagging edge of a pulse, the alternate input of the "and" gate 677 is without a signal upon arrival of the pulse and the space memory 653 will not reset. The pulse from the pulse generator 663 is further coupled through the "or" gate 655 to one input of an EN "and" gate 679. The alternate input of the EN "and" gate 679 receives a signal from the set output of the line length inhibit flip-flop 651. Therefore, the pulse (679c) passes through the EN "and" gate 679 along a conductor 681 resetting the character and space length counter 509 to a value representative of the width of an EN fixed space type matrix.

Upon resetting (time $t_5$), the space pulse generator 663 supplies a signal along conductor 675 to the code length input "and" gate 513 thereby setting the code length input memory 515 and gating on the "and" gates 517, 613 and 615. Clock pulses are allowed to pass into the character and space length input counter 509 and into the "and" gates 613 and 615 of the EN+Δ space accumulator 603 and the EM+Δ space accumulator 604. The clock pulses do not pass into the Δ space accmulator 602 since its input "and" gate 611 has been gated off as a result of the prior setting of the end Δ space count flip-flop 671. After countdown of the character and space length input counter 509, a completion pulse at time $t_6$ of FIG. 7 is applied to conductor 521 resetting the code length input memory 515. In a manner similar to that previously described, the input "and" gates 613 and 615 to the EN+Δ space and EM+Δ space accumulators 603 and 604 are gated off.

The character completion pulse from the character and space length input counter 509 is fed into the space pulse generator 663 via "and" gate 661 causing the generator 663 to provide a single 10-microsecond pulse at terminal 665. This pulse passes through the space memory reset "and" gate 677 resetting the space memory 653 at time $t_6$ (653c). The alternate input of the "and" gate 677 receives its signal from the set output of the end Δ space count flip-flop 671. Upon the resetting of the space memory 653, the input signals to the EN+Δ space input "and" gate 613 and the EM+Δ space "or" gate 617 are removed thereby gating off the input to the EN+Δ space accumulator 603. The output pulse of the generator 663 is also applied through the "or" gate 655 and through an EN "and" gate 679 and conductor 681 to the character and space length input counter 509 for setting thereof.

Upon resetting of the space pulse generator 663, corresponding to time $t_7$ of FIG. 7, a signal is provided by its reset output terminal A to the input of "and" gates 513 via conductor 675. This signal causes the code length input memory 515 to set, gating on the character and space length counter "and" gate 517 and the EM+Δ space accumulator input "and" gate 615. During countdown of the character and space length input counter 509 clock pulses are allowed to pass only into the EM+Δ space accumulator 604 for a period of time which corresponds in number to the width of an EN fixed space type matrix. Since an EN unit, tas previously mentioned, is ½ of an EM unit, the EM+Δ space accumulator 604 has accumulated therein a width count of EM+Δ space for a total of 30 clock pulses (6 min.+6 min.+9 EN+9 EN).

After countdown of the character and space length counter 509, a completion pulse is supplied at time $t_8$ which resets the code length input memory 515 and passes through the sample command flip-flop "and" gate 523 to the reset terminal of the sample command flip-flop 511 for reset thereof. The alternate terminal of the "and" gate 523 is now supplied with a signal from the reset output of the space memory 653 (653c) via conductor 659. The character completion pulse also passes through a reset "and" gate 683 to the reset terminal of the end Δ space count flip-flop 671 for reset thereof. After time $t_8$ each of the various components of the code group width encoding unit 650 are reset to their initial condition in preparation for the processing of a subsequent space code group.

In summary, for each character introduced into the storage loop 402 and sampled by the font related width encoder 501, 10-microsecond pulses are introduced into the line length counter 601 in an amount which corresponds to the width of the type matrix encoded. Upon the sampling of a space code, clock pulses are fed into the line length counter 601 and three space accumulators 602, 603 and 604 in a quantity which corresponds to the minimum width of a minimum space. The line length counter 601 is gated off and the space code group width encoding unit 650 and the code group width encoding unit 500 are recycled causing the space accumulators 602, 603 and 604 to again receive a quantity of clock pulses corresponding to the width of the type matrix of a minimum spaceband. The Δ space accumulator 602 is gated off, and the units 500 and 650 are recycled causing the EN+Δ space and EM+Δ space accumulators 603 and 604 to receive clock pulses of a quantity which corresponds to the type matrix width of an EN fixed space. The input "and" gate 613 to the EN+Δ space accumulator 603 is gated off and the units 500 and 650 recycled. The EM+Δ space accumulator 604 is provided with a quantity of clock pulses which correspond in number to the width of an EN fixed space; thereafter both of the units 500 and 650 are reset to their initial condition.

While the explanation of the operation of the apparatus in response to the coded space signal is relatively lengthy, its operation is accomplished in less than 10 milliseconds, so that the accumulators 602, 603 and 604 have completed their operation before another code group may be introduced into the sample register 407. As previously mentioned, the output of each of the three space accumulators 602, 603 and 604 corresponds to the total maximum line space occupied by the space type matrices encoded upon the storage loop 402, less a minimum spaceband, when the line is justified with either a minimum spaceband, a minimum spaceband plus EN fixed space or a minimum spaceband plus an EM fixed space. The output of the line length counter 607, as previously mentioned, corresponds to the length of the line remaining after subtracting from the total line length, that amount occupied by the character and minimum spacebands. The outputs of the line length counter 601 and three accumulators 602, 603 and 604 are fed into the justification range sensing unit 800.

JUSTIFICATION RANGE SENSING UNIT

Briefly, the justification range sensing unit 800 as shown in FIG. 6 receives the output remainder signal from the line length counter 601 and compares it with the output of the three space accumulators 602, 603 and 604. The unit 800 automatically determines when the character and space code groups encoded upon the loop 402 are within justification range with respect to the present line length and further determines whether an EN or EM fixed space must be used for justification. This information is stored and utilized for punching a justified line upon a tape 960.

Figure 8:
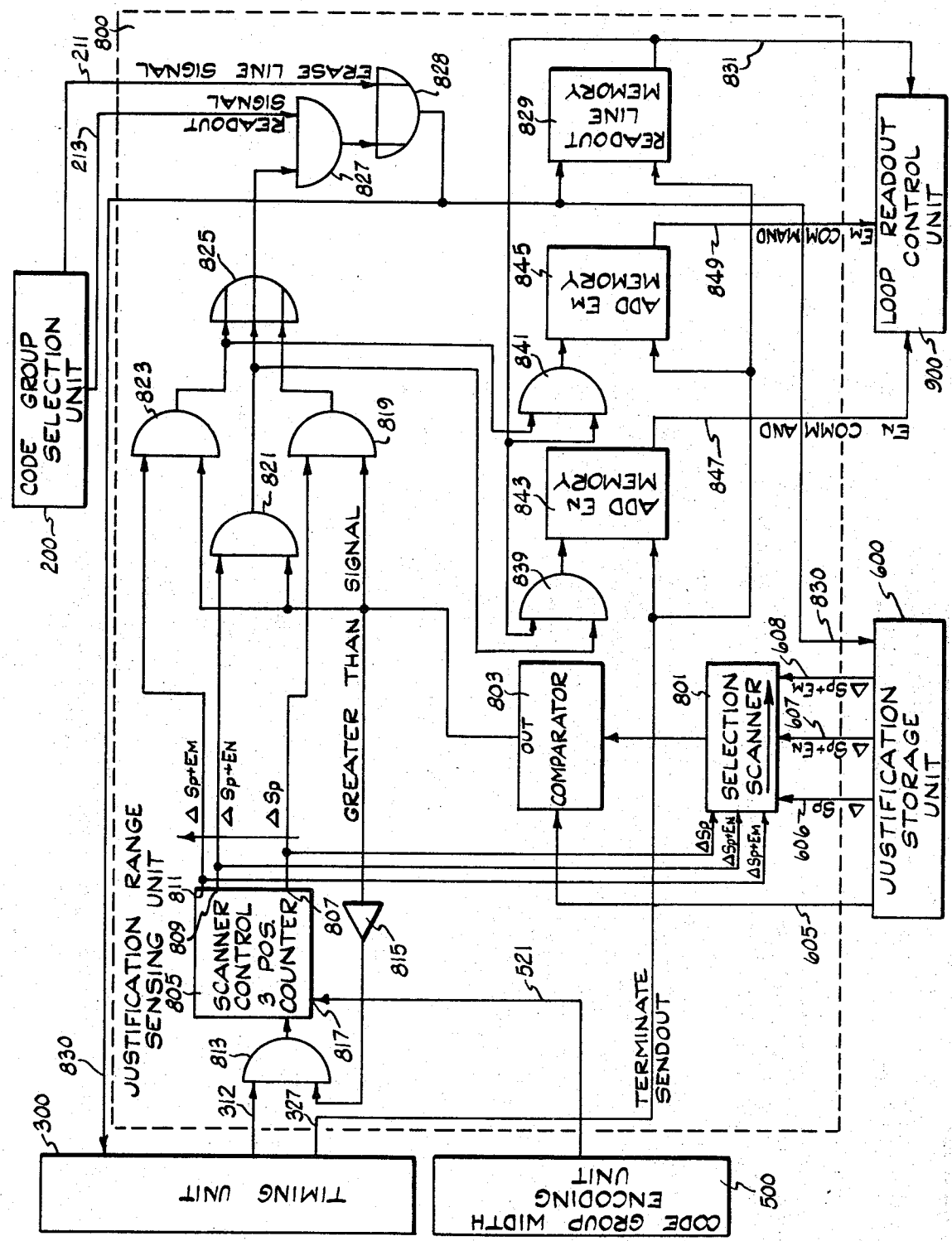
FIG. 8 is a diagram of the justification range sensing unit of FIG. 1.

More particularly, the output of the Δ space 602, EN+Δ space 603 and EM+Δ space 604 accumulators are fed via conductors 606, 607 and 608 into a selection scanner 801 (FIG. 8). The selection scanner 801 is of conventional construction and scans the three inputs coupling each of them successively to the input of a comparator 803. The scanning sequence is controlled by a scanner control counter 805 which is reset in a manner hereafter described. The counter 805 is provided with three positions having three output terminals 807, 809 and 811 respectively corresponding to the selection scanner 801 positions Δ space, Δ space+EN, and Δ space +EM. The input of the scanner control 805 is connected to the output of a scanner control "and" gate 813 having one input thereof connected to the timing unit 300 via conductor 312 so as to receive 10-microsecond clock pulses therefrom. The remaining input to the "and" gate 813 is connected through an inverter 815 to the comparator 803 output.

As will be hereinafter more clearly explained, the comparator 803 does not provide an output signal when the stored code groups are out of justification range. Under such conditions, the 10-microsecond clock pulses flow into the scanner control 805, shifting the output thereof sequentially from the Δ space 807, to the Δ space+EN 809, and finally to the Δ space+EM 811 terminals thereby causing the selection scanner 801 to connect the inputs thereof to the output in the sequence described. A reset terminal 817 of the scanner control 805 is provided with a completion pulse from the character and space length input counter 509 of the output of the code group width encoding unit 500 via conductor 521. Due to this reset signal, the scanner control 805 will direct the selection scanner 801 to scan the outputs of the three space accumulators 602, 603 and 604 after each count down of the character and space length input counter 509. As previously mentioned, the output of the selection scanner 801 is fed into the comparator 803 which has a second input connected to the output of the line length counter 601 via conductor 605 for receipt of the line remainder signal. The comparator 803 provides an output signal upon the occurrence of a signal condition; namely, in the event that the output of one of the space accumulators 602, 603 and 604 is greater than the line remainder. This situation will occur first with regard to the output from the Δ space+EM accumulator 604 and signifies that the type matrices represented by the stored code groups upon the storage loop 402 may be justified by the addition of an EM fixed space with each minimum spaceband. Upon further introduction of characters or spaces into the storage loop 402, an output will occur when the Δ space+EN accumulator 603 output exceeds the line length counter 601 output. And finally as more characters are provided, a signal will occur when the characters upon the storage loop 402 are within justification range of minimum spacebands. However, it should be appreciated that when the Δ space+EN accumulator 603 output exceeds the line remainder, it will not be possible to justify with the inclusion of EM fixed spaces even though the EM+Δ space accumulator 604 output is greater than the line remainder.

When the line is within the justification range of minimum spacebands, all of the accumulator outputs will exceed the line remainder even though the line may be justified with only minimum spacebands. So that the comparator 803 output will provide a correct signal, the selection scanner 801 is controlled by the scanner control 805 to scan from the Δ space 602 to the Δ space+EM 604 accumulator. The "greater than" output from the comparator 803 is fed through the inverter 815 to one input of the input "and" gate 813 of the scanner control 805 thereby stopping the shifting of the scanner control 805. The "greater than" signal from the comparator 803 is also fed to one input of a Δ space "and" gate 819, a Δ space+EN "and" gate 821, and a Δ space+EM "and" gate 823. The alternate inputs of these "and" gates 819, 821, 823 are respectively connected to the three output terminals 807, 809 and 811 of the scanner control 805. The outputs of the three "and" gates 819, 821 and 823 are each connected to an input of an "or" gate 825.

The output of the "or" gate 825 is connected to one input of a readout line memory "and" gate 827, the alternate input of which receives a readout signal from the code group selection unit 200 via the conductor 213 which may be provided by depression of the carriage return, space bar, or predesignated key.

The output of the readout memory "and" gate 827 is connected to one input of a loop readout control "or" gate 828, the alternate input of which is connected to the code group selection unit 200 as will hereinafter be described. The output of the "or" gate 828 is connected to the input of a readout line memory 829 which is a conventional flip-flop circuit. The set output of the memory 829 is fed into the loop readout control unit 900 via a conductor 831. The output of the loop readout control "or" gate 828 is also connected by a conductor 830 to the timing unit 300 for purposes which will be explained hereafter. The output of the "or" gate 828 is further connected by the conductor 830 to the reset terminals of the line length counter 601 and the accumulators 602, 603 and 604. The outputs of each of the Δ space+EN "and" gate 821 and the Δ space+EM "and" gate 823 are respectively connected to one input of an add EM memory input "and" gate 839 and an add EM memory input "and" gate 841. The alternate inputs of each of the "and" gates 839 and 841 are connected to the set output of the readout line memory 829. The output of "and" gate 839 is connected to the set input of an add EN memory 843 and the output of the "and" gate 841 is connected to the set input of an add EM memory 845. The set output of the add EN memory 843 provides an add EN command signal to the loop readout control unit 900 via a conductor 847 and the set output of the EM memory 845 provides an add EM command signal to the unit 900 via a conductor 849. The reset terminals of the memories 843, 845 and 829 are parallel connected and receive a terminate line sendout signal from the timing unit 300 as will be hereafter described.

In operation, each character completion pulse from the character and space length input counter 509 resets the scanner control 805. Upon reset, the selection scanner 801 will connect the Δ space accumulator 602 output to the comparator 803. It will be assumed for purposes of discussion that a signal is not present at the output of the comparator 803, i.e., the code groups stored on the storage loop 402 do not constitute a line justifiable with minimum spacebands. Thus, a signal will pass from the inverter 815 to the scanner control input "and" gate 813 thereby gating the gate 813 on so as to allow the 10 microsecond clock pulses to pass to the scanner control 805. The first 10-microsecond pulse shifts the scanner control 805 output and correspondingly the EN+Δ space accumulator 603 output is connected to the input of the comparator 803. Similarly, the next clock pulse shifts the EM+Δ space accumulator 604 output to the comparator 803 for comparison with the remainder signal from the line length counter 601.

It will now be assumed that upon switching of the EM+Δ space accumulator 604 output signal to comparator 803, a determination is made by the comparator 803 that the accumulator 604 output is greater than the line remainder thereby indicating that the line at this time may be justified by the addition of an EM fixed space to each minimum spaceband. The output of the comparator 803 is applied to the parallel connected inputs of the three "and" gates 819, 821 and 823; however, the remaining input of only one of the three "and" gates 819, 821 and 823; namely, the EM+Δ space "and" gate 823, receives a signal. This signal passes through the "or" gate 825 and to one input of the add EM memory input "and" gate 841 and to one input of the readout line memory input "and" gate 827. Simultaneously therewith, a visual signal, such as a light on the typewriter 201 activated by the output of "and" gate 823, is provided to the operator. Upon depression of the space bar or carriage return, a readout signal is provided along conductor 213. Should the operator decide that the particular word being typed may be hyphenated, a predesignated key of the auxiliary code keyboard 205 may be depressed thereby providing a signal to the readout line memory "and" gate 827 causing the readout line memory 829 to set providing a signal via conductor 831 to the loop readout control unit 900 and to one input of the add EM memory input "and" gate 841 setting the add EM memory 845 so as to supply an add EM command signal via conductor 849 to the loop readout control unit 900.

For purposes of further discussion, it will be assumed that the word being typed is not hyphenable at this point or that the operator desires a tighter line. After the introduction of the next code group into the storage loop 402 and the subsequent countdown of the character space length input counter 509, a completion pulse is again provided to the input of the scanner control 805 resetting same. The selection scanner 801 again scans the space accumulators 602, 603 and 604 in a manner similar to that previously described.

For purposes of further discussion it will be assumed that after the introduction of several characters, the line is within justification range with respect to EN fixed spaces. The character completion pulse resets the scanner control 805 and the first 10-microsecond pulse causes the EN+Δ space accumulator 603 output to pass through the selection scanner 801 to the comparator 803. The "greater than" signal is obtained together with a visual indication (e.g., a light on the typewriter 201 activated by the output of "and" gate 821) to the operator that the line may be justified with an EN fixed space added to each minimum spaceband. Upon the occurrence of the "greater than" signal from the comparator 803, this signal passes to the inverter 815 gating off the clock pulses flowing into the scanner control 805 thereby preventing further scanning by the selection scanner 801. At this time, both inputs of the EN+Δ space "and" gate 821 are provided with signals causing a signal to flow through the "or" gate 825 to the readout line memory input "and" gate 827. A signal is also provided to one input of the add EN memory input "and" gate 839. At this time, the operator may, if desired, send the line out from the storage loop 402 to the tape punch unit 950 in the manner previously described. For purposes of discussion, it will be assumed that the operator desires to continue the line. Thus, the readout line memory 829 is not set and the operator may continue to feed letters into the storage loop 402.

After a sufficient number of code groups have been introduced into the storage loop 402, the storage loop 402 will be within justification range of minimum spacebands. A character completion pulse from the character and space length input counter 509 causes the scanner control 805 to reset and the selection scanner 801 to start scanning. However, upon reset, the Δ space accumulator 602 output from the selection scanner 801 will be greater than the line remainder signal from the line length counter 601 indicating that the line may be justified with minimum spacebands. The "greater than" signal from the comparator 803 gates off the input to the scanner control 805 preventing further 10 microsecond pulses from passing therethrough. At this time the operator again has the choice of either sending the line from the storage loop 402 or continuing to place code groups upon the storage loop 402. However, if further characters are introduced, discretion must be exercised since if a large quantity of additional codes are introduced into the storage loop 402 the justification range may be exceeded. In this manner, the justification range sensing unit 800 determines when the line stored upon the storage loop 402 is within justification range and whether EN or EM fixed spaces are necessary to obtain justification. Upon command from the operator, the information within the storage loop 402 is fed to the loop readout control unit 900 together with information concerning the particular justification system to be used.

LOOP READOUT CONTROL UNIT AND TAPE PUNCH UNIT

As previously mentioned, at the selection of the operator, a readout signal may be given by the operator when the line is within justification range. This readout signal is supplied from the code group selection unit 200 to the readout line memory 829 causing it to set as well as the add EN 843 or add EM 845 memories if either is conditioned to be set. In the event the justification is to be by means of minimum spacebands, neither of these last mentioned memories 843 and 845 will be set. This readout signal also passes through "or" gate 828 to the justification storage unit 600 for reset of the line length counter 601 and the accumulators 602, 603 and 604.

Referring to the timing unit 300 of FIG. 3, the readout command signal fed into the normal input of the readout memory 829 is also coupled via conductor 830 to the normal input of a send the line synchronization flip-flop 318. The set output thereof provides a signal to one input of a synchronization "and" gate 319. The remaining input of the "and" gate 319 is connected to the output terminal 304 of the last input address marker 303 and receives 10-millisecond pulses therefrom. Upon the occurrence of the first 10 millisecond output pulse immediately after the send the line synchronization flip-flop 318 has set, a signal will pass through the "and" gate 319 to the reset terminal of the flip-flop 318 for reset thereof and to the reset terminal 320 of the send the line address marker 321. The address marker 321 is a counter of conventional construction which receives clock signals from the master clock 301 via conductor 312 and provides an output pulse at its output terminal 322 every 10 milliseconds.

Thus, it can be seen that upon receipt of a readout command, the send the line address marker 321 and the last input address marker 303 are placed in synchronization. The output pulse from terminal 322 is coupled to one input of a terminate readout "and" gate 323, the alternate input of which is connected to the output terminal 324 of a last output address marker 325. The last output address marker 325 is a counter of construction similar to that of the send the line address marker 321 and receives clock signals from the master clock 301 so as to provide 10-millisecond spaced output pulses. The marker 325 also provides a short pulse output at terminal 326 which occurs 10 microseconds before the normal 10-millisecond output pulse. When the illustrated apparatus is initially turned on, the last output address marker 325 is started in synchronization with the last input address marker 303 and remains in synchronization until information is fed into the storage loop 402, in other words, so long as a reset hold signal is not applied to terminal 311 of the last input address marker 303.

As previously mentioned, the 10-millisecond pulses from the last input address marker 303 occur exactly 10 microseconds after passage of the last bit in the last code group through the input "and" gate 401 of the storage and readout unit 400. Upon reflection, it will be realized that the timing of the output pulse of the last output address marker 325 is such that the pulse will occur before readout is started, at that instant just prior to the entrance into the gate 401 of the first bit of the first code group of the line to be removed from the storage loop 402. The send the line address marker 321 output pulse occurs 10 microseconds after passage of the last bit of the last code group in the line to be removed from the storage loop 402 through the "and" gate 401. It should be further noted that when the last output address marker 325 pulse and the send the line address marker 321 pulse occur simultaneously, the total removal of the line from the loop 402 will be completed. To provide a signal when this situation occurs, the outputs of each of the markers 321 and 325 are fed as previously mentioned into the inputs of the terminate readout "and" gate 323, the output of which provides a terminate readout command signal to the justification range sensing unit 800 via conductor 327 for resetting of the add EN code memory 843, the add EM code memory 845 either or neither of which may be set and the readout line memory 829.

For purposes of discussion, it will be assumed that the justification range sensing unit 800 has determined that the line being stored upon the storage loop 402 is within justification range and that justification is to be accomplished by the addition of an EN fixed space for each minimum spaceband, thereby causing the add EN memory 843 and readout line memory 829 to set upon the receipt of a send the line command from the code group selection unit 200. As previously mentioned, the last output address marker 325 provides a short pulse at the terminal 326 which occurs 10 microseconds before the normal last output pulse. This short pulse is fed by way of a conductor 329 to one input of the "or" gate 503 of the font related width encoder 501. Upon the occurrence of this short pulse, the font related width encoder 501 reads the code bits in positions 2 through 7 of the sample register 407 of the line storage unit 400.

It is further assumed that an encoded character group has been sampled; 10 microseconds later, an output pulse occurs at terminal 324 of the last output address marker 325 and this pulse is coupled through a conductor 332 into one input of an input "and" gate 901 (FIG. 9) the output of which is connected to a buffer load memory character readout control flip-flop 903. The remaining two inputs of the "and" gate 901 are respectively connected to the set output of the readout line memory 829 via conductor 831 and to the reset output of a punch in process memory 951 which may be a conventional bistable flip-flop, located in the tape punch unit 950. Thus, upon occurrence of the last output address marker 325 pulse, the buffer load memory 903 is set. The set output is connected via conductor 905 to the input of the 70 microsecond register 309 through the "or" gate 307. This pulse is also applied to a reset hold terminal 333 of the last output address marker 325.

Upon introduction of the signal, the 70-microsecond register 309 commences to run. As previously mentioned, the set output of the memory 903 is also connected to the set input of the punch in process memory 951 causing it to set, thereby removing a signal from one of the inputs to the "and" gate 901 so as to prevent the passing of further signals into the buffer load memory character readout control flip-flop 903. The set output of the buffer load memory 903 is also connected to one input of a loop readout "and" gate 907. A second input of the "and" gate 907 is connected to the reset output of a space code flip-flop 909, and third and fourth inputs are respectively connected to the output of the sample register 407 of the line storage unit 400 via conductor 413 and to the error correction unit 1000.

The code group which has just been sampled passes along conductor 413, through the loop readout "and" gate 907 and into a series to parallel converter 953 of the tape punch unit 950. The converter 953 is of conventional construction and receives the bits composing the code group in a serial manner and converts them into a parallel output feeding the parallel bits into a storage buffer and punch unit 955. Ten microseconds after the last bit of information in the code group passes through the loop readout "and" gate 907 a completion pulse from the 70-microsecond register 309 is coupled via the conductor 313 to the reset terminal of the buffer load memory 903 for reset thereof.

As previously mentioned, each of the register outputs of the 70-microsecond register 309 are fed to alternate inputs of the "or" gate 315 and through the inverter 411 to the recirculation "and" gate 409 of the storage loop 402. Since the 70-microsecond register 309 is in operation during readout of a code group, the "and" gate 409 will be gated off thereby erasing the particular code group being read out of the storage loop 402 into the tape punch unit 950.

Referring to the tape punch unit 950, the set output of the punch in process memory 951, as previously mentioned, provides a pulse in response to the readout command. The output pulse is fed through an 80-microsecond delay line 957 and into the storage buffer and punch 955. The pulse passing through the delay line 957 will enter the storage buffer and punch 955 a short time after the last bit of information of the code group has been entered into the storage buffer and punch 955. The output of the 80-microsecond delay 957 actuates the punch 955 and is also passed to the input of a punch delay line 959. The time constant of the punch delay line 959 is slightly greater than the time required for the punch 955 to complete its operation upon the tape 960. The output of the punch delay line 959 is fed to the storage buffer and punch 955 for clearance of the storage buffer and punch 955 and to the reset input of the punch in process memory 951 for reset thereof. Since the mechanical operation of the punch 955 requires in excess of 100 milliseconds, the punch in process memory 951 functions to inhibit the introduction of any further code groups into the storage buffer and punch 955 until the punch 955 has completed punching the previous code group into the tape 960. In the event that neither the add EN memory 843 nor the add EM memory 845 have been set, then and in such event a space code group will receive processing in a manner similar to that previously described in connection with the readout of an encoded character.

For purposes of discussion, it will now be assumed that upon the occurrence of the next short pulse from the last output address marker 325, the font related width encoder 501 samples a space code within positions 2 through 7 of the sample register 407. Upon reading the space code, the font related width encoder 501 provides a space signal via conductor 502 to one input of a space code input "and" gate 911. The alternate input of the "and" gate 911 is connected to the last output address marker 325 short pulse terminal 326 via conductor 329. Thus, upon the simultaneous occurrence of both conditions, namely, the presence of a space code within the sample register 407 and a short pulse to the gate 911, the space code flip-flop 909 sets, resulting in a signal passing to one input of each of an EN "and" gate 913 and an EM "and" gate 915. The alternate inputs of the EN "and" gate 913 and the EM "and" gate 915 are respectively connected via the conductor 847 and 849 to the set outputs of the add EN memory 843 and the add EM memory 845. Since it was assumed previously that the add EN memory 843 was actuated, thereby providing a signal to the alternate input of the EN "and" gate 913, the space code signal passes therethrough to the storage buffer and punch 955.

Upon the occurrence of the next to last output address marker pulse, the buffer load memory 903 is set in a manner similar to that previously described thereby starting the 70-microsecond register 309 and also setting the punch in process memory 951. As previously mentioned, the space code flip-flop 909 has been set. This operation removes a signal from one of the inputs of the "and" gate 907 preventing the space code signal upon the storage loop 402 from passing therethrough. In lieu of the space signal a substitute signal (i.e., an EN fixed space plus a minimum spaceband) is introduced from the EN "and" gate 913. The start signal to the 70-microsecond register 309 passes through the 80-microsecond delay line 957 causing the punch 955 to punch the tape 960 after which the punch in process memory 951 and storage buffer and punch 955 are reset in the manner previously described. Upon completion of the operation of the 70-microsecond register 309, the completion pulse therefrom is used to reset the space code flip-flop 909 and the buffer load memory 903. The space code group upon the storage loop 402 is erased in a manner similar to that previously described in connection with the erasing of a character code group.

The set output of the buffer load memory 903 is applied to the reset terminal 333 (FIG. 3) of the last output address marker 325 via conductor 905 causing the reset thereof to hold for that period of time which corresponds to operation of the 70-microsecond register 309. By this means, the normal output pulse of the last output address marker 325 is held 70 microseconds so that its occurrence will correspond in time to that instant when the first bit of the next code group to be removed from the storage loop 402 is about to enter the recirculation gate 409 of the storage loop 402. The last output address marker 325 pulse is successively delayed each time a new code group is read out of the storage loop 402 and upon the readout of the last code group, the last output address marker 325 pulse, as previously mentioned, will occur simultaneously with the send the line address marker 321 pulse. The simultaneous occurrence of these two pulses at the inputs of the terminate readout "and" gate 323 provides a terminate readout command signal via conductor 327 to the justification range sensing unit 800, resetting the readout line memory 829 and the add EN 843 or add EM 845 memories whichever, if any, are set.

Since three separate address markers are provided, one 303 for controlling introduction of information on the storage loop 402, another 325 for the removal therefrom and a third 321 to mark the starting code group of the next line, information may be introduced into the storage loop 402 and into the justification storage unit 600 while the previous line is being read out of the storage loop 402 and punched upon the tape 960. The ability to simultaneously introduce and remove code groups from the apparatus greatly increases the speed at which material may be justified in that the operator is not required to sit idly by while the tape 960 is being punched, but may continue typing the next line. The apparatus illustrated particularly lends itself to the inclusion of an error correction system which permits the operator to erase a particular code group, word or line as desired.

ERROR CORRECTION UNIT

As previously mentioned, the error correction unit 1000 of FIG. 10 affords the operator an opportunity to erase errors as they are detected during typing. Briefly, the unit 1000 permits three types of error correction; firstly, it allows the operator to erase a code group, secondly it allows the operator to erase an entire word together with the space preceding the word and finally it allows the operator to erase the entire line upon the storage loop 402. To select the desired erasing system, the operator is merely required to depress a corresponding key located on the auxiliary code keyboard 205. Depression of such key sends a signal to the error correction unit 1000 for processing in a manner to be hereafter described.

Upon the depression of the erase code group key (not shown), a signal is introduced along conductor 209 to one input of an erase code group memory input "or" gate 1001, the output of this "or" gate 1001 being connected to the set input of an erase code group memory 1003 which is in the form of a conventional flip-flop circuit. The set output of the erase code group memory 1003 is connected to one input of a reset "and" gate 1005, the output of which is connected to the reset terminal of the erase code group memory 1003. The set output of the erase code group memory 1003 is also connected to one input of an erase code group memory output "and" gate 1007. The remaining input of this "and" gate 1007 is connected to terminal 316 of the last input address marker 303 via conductor 317. The last input address marker 303 provides a pulse which arrives 80 microseconds before the normal 10 millisecond last input address 303 pulse. It should be noted that this short pulse will occur precisely at the moment when the six bits comprising the code group which is to be erased are located in the second through seventh positions of the sample register 407 of the line storage unit 400 (FIG. 4).

The output terminal of the "and" gate 1007 is connected to one of the inputs of the reset "and" gate 1005. The remaining input of the "and" gate 1005 is provided with a normally present signal from the reset output of an erase word memory 1006, as will hereinafter be described. The output pulse from the output "and" gate 1007 thus passes through the reset "and" gate 1005 resetting the erase code group memory 1003. The output pulse is also connected by means of conductor 1009 to one input terminal of the font related width encoder input "or" gate 503, and passes therethrough causing the width encoder 501 to read the code group to be erased and correspondingly set the character and space length input counter 509. The output pulse from the output "and" gate 1007 is also coupled to the set input of a justification storage directional control 1011 which includes a standard flip-flop circuit. The reset output and the set output of the directional control 1011 are respectively connected by conductors 1013 and 1015 to the line length counter 601 and to the space accumulators 602, 603 and 604. In its normal position, the directional control 1011 provides a signal to the line length counter 601 causing it to countdown from its preset line value in accordance with the 10-microsecond clock pulses which pass therein. Each of the space accumulators 602, 603 and 604 is biased for counting up in proportion to the clock pulses received. The introduction of a pulse to the set input of the directional control 1011 transfers the output signal to the set terminal thereof, thereby reversing the operational direction of the line length counter 601 and space accumulators 602, 603 and 604 for removal of the information previously stored therein.

In a manner similar to that previously described in connection with the storage of information the font related width encoder 501 provides, after sampling the code group, an output signal which either sets the character and space length input counter 509 directly or is processed by the space code width encoding unit 650 before setting the counter 509. A quantity of pulses is introduced into the line length counter 601 and the space accumulators 602, 603 and 604 in proportion to the width of the type matrix represented by the code group sampled. However, since the operational direction of the line length counter 601 and space accumulators 602, 603 and 604 has been reversed by the justification storage control 1011, such information will be removed from the justification storage unit 600. Thus, the width information relating to the most recently introduced code group which has been stored upon the justification storage unit 600 is thereby removed.

The output pulse from the output "and" gate 1007 of the erase code group memory 1003 is connected to the input "or" gate 307 of the 70 microsecond shift register 309 of the timing unit 300 by means of the conductor 1009. Upon the application of this pulse to the 70-microsecond register 309, the register 309 is started, thus supplying a signal via conductor 314 to the inverter 411, thereby removing a signal from one input of the erase "and" gate 409. As previously mentioned, the code group is sampled when the bits thereof are located in the second through the seventh positions of the sample register 407. The sample register 407 is provided with an eighth position. Consequently, a 70-microsecond time lapse is required for the last bit of the code group to pass out of the sample register 407 after the code group has been read. This period of time corresponds to the operational time of the 70-microsecond register 309 of the timing unit 300. Thus, the entire erroneous code group is prevented from passing through the "and" gate 409, and in this manner erased from the storage loop 402.

The short pulse passing through the output "and" gate 1007 is also coupled by conductor 1009 to one input of the last input address marker reset "or" gate 310 resulting in immediate reset of the addresss marker 303. This reset signal is of short duration, and is produced by the short pulse output of the last input address marker 303 immediately after the occurrence of an erase signal. As a result of this resetting, the last input address marker 303 is prematurely reset so that thereafter the normal output pulse will occur 10 microseconds after the last bit of the last introduced code group passes through the storage loop input "and" gate 401. Thus, by the depression of a key upon the auxiliary code keyboard 205, the error correction unit 1000 causes the justification storage unit 600 to remove the width information previously stored therein which corresponds to the erroneous code group. The erroneous code group from the storage loop 402 is erased, and the last input address marker 303 is prematurely reset so that the normal output pulse therefrom will be in step with or indicate the last code group (i.e., the code group prior to the one removed) circulating about the storage loop 402.

To actuate the erase word feature, the operator depresses a word erase key (not shown) on the auxiliary code keyboard 205 which may alternately be located upon the regular keyboard 201 and which supplies a signal by means of the conductor 207 to the normal input of the erase word memory 1006. The normal output of the erase word memory 1006 is, as previously mentioned, connected to one of the inputs of the erase code group memory reset "and" gate 1005 and upon setting of the memory 1006 the gate 1005 is opened. The signal produced by the word erase key is also supplied to one of the inputs of the erase code group memory input "or" gate 1001 setting the erase code group memory 1003. In a manner similar to that previously described in connection with the erasing of a single code group, the next short pulse from the last input address marker 303 is fed through the output "and" gate 1007 for actuation of the justification storage direction control 1011, the font related width encoder 501 and the reset terminal 311 of the input address marker 303 in a manner similar to that previously described in connection with the erasing of the erroneous code group. The output of the "and" gate 1007 is also coupled to one of the inputs of the reset "and" gate 1005; however, the reset "and" gate 1005 is gated off by the erase word memory 1006 thereby preventing reset of the erase code memory 1003. Each time a short pulse is supplied by the last input address register 303, a code group will be removed from the storage loop 402, the justification storage unit 600 modified, and the timing of the last input address register 303 adjusted to compensate for removal of the code group from the storage loop 402. Code groups are sequentially removed from the storage loop 402 until reset of the erase word memory 1006 in a manner hereinafter described.

Upon the sampling of a space code group by the font related width encoder 501, a signal is supplied along the conductor 502 to the reset terminal of the erase word memory 1006 for reset thereof. Reset of the erase word memory 1006 occurs simultaneously with the short pulse thereby allowing the short pulse to pass through the "and" gate 1005 for reset of the erase code group memory 1003. In response to the sampling of a code group, the code group width encoding unit 500 and the space code width encoding unit 650 function in a manner similar to that described in connection with the storage of a code group signal. However, since the direction of the storage unit 600 has been reversed by the justification storage direction control 1011, the space width information previously stored therein is removed. The space code group is removed from the storage loop 402 and the timing of the last input address marker 303 is adjusted to compensate for its removal. Briefly, upon the depression of the erase word key of the auxiliary code keyboard 205, all the code groups which comprise the erroneous word are removed from the storage loop 402 as is the code group representing the space immediately preceding the start of the word. Thereafter, the operator depresses the space bar of the typewriter 201 and retypes the word in correct form.

The depression of the erase line key (not shown) of the auxiliary code keyboard 205 which may alternatively be located on the typewriter keyboard 201 produces a signal which is coupled by means of the conductor 211 to the set input of an erase line memory 1023, which may be a conventional bistable flip-flop, and to the readout "or" gate 828 of the justification range sensing unit 800. The reset output of the erase line memory 1023 is connected via a conductor 1025 to one input of the loop readout "and" gate 907. The erase key signal sets the erase line memory 1023 thereby removing the signal from the "and" gate 907, gating it off. The setting of the erase line memory 1023 prevents code groups from passing from the line storage unit 400 into the tape punch unit 950 during the erasing process. As previously mentioned, the erase line key signal is also coupled to one input of the readout "or" gate 828. The signal passes through this "or" gate 828 and is processed by the justification range sensnig unit 800 and the loop readout control unit 900 in a similar manner to that previously described in connection with the send out of justified line. However, as the information is fed out from the storage loop 402, it is prevented from passing into the tape punch unit 950 by the "off" gating of the "and" gate 907 so as to effectively erase the line from the loop 402. During this erasing procedure, the operator may proceed to retype the line upon the loop 402.

As previously mentioned, in connection with the readout of a justified line from the storage loop 402, the output pulse from the last output address marker 325 and the send the line address marker 321 gradually occur more closely together until, at a time corresponding to complete readout from the loop 402, the pulses occur simultaneously, thereby providing a coincident pulse at the output of the terminate readout "and" gate 323 which is coupled by means of a conductor 327 to the reset terminal of the erase line memory 1023, thereby resetting the memory 1023 and returning the error correction unit 1000 to its initial condition. The justification apparatus previously described greatly facilitates the justification of printed material.

We claim:

1. An apparatus for receiving unjustified material and providing an informational output for the control of typesetting equipment to direct such equipment in the composition of a justified line, said apparatus comprising means for supplying a plurality of spaced code groups, each code group representing a character or space of the unjustified material, having a predetermined number of serial levels and having a predetermined time period associated therewith, means generating an informational output in response to code groups supplied thereto, an input timing means including an input address marker providing first timing pulses, a closed delay loop including a delay line having sufficient capacity to store code groups representing one line of type, an input means coupled to said input timing means and to said supplying means for feeding to said delay line in response to one of said first timing pulses one of said code groups, and an output means for coupling the output of said delay line to said input means in the absence of a control signal and to said generating means in the presence of said control signal, the period of said first timing pulses being equal to the time required for a code group to make one complete circuit of said closed delay loop, means coupled to said input address marker for delaying the first timing pulses for said time period of a code group each time a code group is fed to said delay line, encoding means coupled to said delay loop for sampling each of said code groups fed into said delay loop and providing a width signal corresponding to the width of the individual type matrice represented by said sampled code group, justification storage means coupled to said encoding means for receiving said width signals, said justification storage means including a line length counting means for couting said width signals and providing a remainder signal indicating the remaining portion of the justified line unoccupied by the type matrices represented by the code groups stored in the delay line, and at least one space storage means for receiving the width signals related to space band matrices and providing a space signl related to the cumulative total thereof, sensing means coupled to siad justification storage means and responsive to said remainder signal and said space signal for providing an output signal when said space signal and said remainder signal attain a relationship showing the total of the type matrices represented by the stored code groups is sufficient to comprise a justified line, means for providing a readout signal, readout control means coupled to said sensing means and to said readout signal providing means for generating said control signal in response to said output signal and said readout signal, and means for feeding said cortrol signal to said output means to thereby cause the stored code groups in said closed delay loop to be fed to said generating means.

2. An apparatus in accordance with claim 1 which further includes an output timing means including an output address marker for providing second timing pulses having a period equal to that of said first timing pulses, said output address marker being coupled to said readout control means for preventing the generation of said control signal in the absence of said second timing pulse, means for coupling said control signal to said output address marker for delaying the second timing pulse for said time period of a code group each time a stored code group is fed to said generating means, a send the line marker for providing third timing pulses having a period equal to that of said first timing pulses, means coupled to said readout control means for synchronizing said first timing pulses and said third timing pulses in response to said output signal, terminating means coupled to said output address marker and to said send line marker for providing a terminating signal when said second timing pulse is synchronized with said third timing pulse, and means for coupling said terminating signal to said readout control means for terminating said output signal in response to said terminating signal whereby code groups can be simultaneously removed from said delay loop while additional code groups are stored thereon.

3. An apparatus in accordance with claim 1 wherein said closed delay loop further includes a shift register connected in series between said delay line and said output means, said input address marker provides a short pulse sufficiently prior to said first timing pulse so that it occurs when the code group fed into said delay line is in the register, and means coupling said short pulse to said encoding means to actuate the sampling of said encoding means whereby said encoding means reads the code group stored in said shift register to provide said width signals.

4. An apparatus in accordance with claim 1 in which said justification storage means includes three space storage means, each of which receives those width signals related to the space band matrices, a first of said space storage means providing a first space signal indicating the width of $\Delta$ spaces corresponding in number to the total of the sampled space band width signals, a second of said space storage means providing a second space signal indicating the width of $EN+\Delta$ spaces corresponding in number to the total of the sampled space band width signals, a third of said space storage means providing a third space signal indicating the width of $EM+\Delta$ spaces corresponding in number to the total of the sampled space band width signals, said sensing means includes a comparator for comparing one of said space signals with said remainder signal and providing said output signal when said one space signal is greater than said remainder signal and a scanning circuit coupled to said encoding means and to said first, second and third space storage means for causing said first, second and third space signal to be sequentially connected to said comparator in response to sampling of each code group and providing a first, second or third space adding signal corresponding to which space signal first causes said comparator to provide said output signal, and said informational output generating means including an add EN means and an add EM means actuated respectively by said second and third space adding signals for adding an EN code group or an EM group to each space code group received by said generating means.

5. An apparatus in accordance with claim 2 in which said justification storage means includes three space storage means, each of which receives those width signals related to the space band matrices, a first of said space storage means providing a first space signal indicating the width of $\Delta$ spaces corresponding in number to the total of the sampled space band width signals, a second of said space storage means providing a second space signal indicating the width of $EN+\Delta$ spaces corresponding in number to the total of the sampled space band width signals, a third of said space storage means providing a third space signal indicating the width of EM spaces corresponding in number to the total of the sampled space band width signals, said sensing means includes a comparator for comparing one of said space signals with said remainder signal and providing said output signal when said one space signal is greater than said remainder signal and a scanning circuit coupled to said encoding means and to said first, second and third space storage means for causing said first, second and third space signal to be sequentially connected to said comparator in response to sampling of each code group and providing a first, second or third space adding signal corresponding to which space signal first causes said comparator to provide said output signal, and said informational output generating means including an add EN means and an add EM means actuated respectively by said second and third space adding signals for adding an EN code group or an EM group to each space code group received by said generating means.

6. An apparatus in accordance with claim 5 in which said delay line is a magnetostrictive line.

7. An apparatus in accordance with claim 2 which comprises an error correction means for erasing code groups stored in said closed delay loop, said first erase error corerction means including a first means for generating an erase signal, second means connected to said first means and to said input address marker for generating an inhibit signal for said time period of a code group immediately prior to said first timing pulse in response to said erase signal, third means coupling said inhibiting signal to said input means, fourth means coupled to said first means and to said input address marker for reversing the operation of said line length counter and said space storage means in response to said erase signal for said time period of a code group immediately prior to said first timing pulse and fifth means coupled to said first means for advancing said first timing pulses a time equal to said time period of a code group in response to said erase signal.

References Cited

UNITED STATES PATENTS

| | | |
|---|---|---|
| Re. 26,144 | 1/1967 | Robbins et al. |
| 2,632,548 | 3/1953 | Ackerman. |
| 2,682,814 | 7/1954 | Higonnet et al. |
| 2,762,485 | 9/1956 | Bafour et al. |
| 2,934,145 | 4/1960 | Blodgett. |
| 3,011,154 | 11/1961 | Dirks. |
| 3,049,210 | 8/1962 | Moyroud. |
| 3,234,363 | 2/1966 | Garth et al. |
| 3,332,617 | 7/1967 | Higonnet et al. |

ERNEST T. WRIGHT, JR., Primary Examiner

U.S. Cl. X.R.

197—20, 84

UNITED STATES PATENT OFFICE
CERTIFICATE OF CORRECTION

Patent No. 3,530,976                    Dated September 29, 1970

Inventor(s) F. G. Haggason, Jr., et al.

It is certified that error appears in the above-identified patent and that said Letters Patent are hereby corrected as shown below:

Column 1, line 20 - for "textural", read "textual".

Column 1, line 69 - for "Textural", read "Textual".

Column 4, line 56 - preceding "255" insert "gate".

Column 5, line 64 - for "stoage", read "storage".

Column 6, line 13 - for "whereby", read "thereby".

Column 7, line 26 - for "releared", read "released".

Column 13, line 14 - for "607", read "601".

Column 22, line 69 - preceding "justified" insert "a".

Column 24, line 11 - for "send line", read "send the line".

Column 25, line 18 - delete "first erase".

SIGNED AND
SEALED
DEC 29 1970

(SEAL)
Attest:

Edward M. Fletcher, Jr.
Attesting Officer

WILLIAM E. SCHUYLER, JR.
Commissioner of Patents